(12) United States Patent
Lee et al.

(10) Patent No.: US 12,277,542 B2
(45) Date of Patent: Apr. 15, 2025

(54) AUTOMATIC PAYMENT SYSTEM

(71) Applicant: HANWHA VISION CO., LTD., Seongnam-si (KR)

(72) Inventors: Younghun Lee, Seongnam-si (KR); Kyungmok Lee, Seongnam-si (KR); Jongseo Lee, Seongnam-si (KR); Woong Jeon, Seongnam-si (KR); Minsuk Sung, Seongnam-si (KR); Meejee Jeong, Seongnam-si (KR); Wookeun Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

(21) Appl. No.: 18/582,800

(22) Filed: Feb. 21, 2024

(65) Prior Publication Data
US 2024/0193578 A1 Jun. 13, 2024

Related U.S. Application Data

(63) Continuation of application No. 17/349,945, filed on Jun. 17, 2021, now Pat. No. 11,941,604, which is a continuation-in-part of application No. PCT/KR2020/015775, filed on Nov. 11, 2020, and a continuation-in-part of application No. PCT/KR2019/014972, filed on Nov. 6, 2019.

(51) Int. Cl.
| | |
|---|---|
| *G06Q 20/32* | (2012.01) |
| *G06K 7/14* | (2006.01) |
| *G06V 40/16* | (2022.01) |
| *G06V 40/20* | (2022.01) |
| *H04N 7/18* | (2006.01) |

(52) U.S. Cl.
CPC ....... *G06Q 20/3274* (2013.01); *G06K 7/1413* (2013.01); *G06V 40/166* (2022.01); *G06V 40/20* (2022.01); *H04N 7/18* (2013.01); *G06V 40/178* (2022.01)

(58) Field of Classification Search
None
See application file for complete search history.

(56) References Cited

U.S. PATENT DOCUMENTS

2014/0129362 A1* 5/2014 Marquis ............... G07G 1/0036
705/23

FOREIGN PATENT DOCUMENTS

| | | |
|---|---|---|
| KR | 10-2014-0134457 | 11/2014 |
| KR | 10-1876433 B1 | 7/2018 |
| WO | 2019/017720 A1 | 1/2019 |
| WO | WO-2019190388 A1 * | 10/2019 ......... G01G 19/4144 |

* cited by examiner

*Primary Examiner* — Kristy A Haupt
(74) *Attorney, Agent, or Firm* — McLean IP Global; Jason Y. Pahng

(57) ABSTRACT

An automatic payment system includes: first and second conveyer stages arranged along a conveying route on which products are moved; a slope disposed between the first and second conveyer stages on the conveying route; at least one first ID sensor facing the first conveyer state to sense IDs attached to the products when the products overlap the first conveyer stage; at least one second ID sensor facing the second conveyer stage to sense IDs attached to the products when the products overlap the second conveyer stage; and a bottom ID sensor facing the conveyer route under the slope.

12 Claims, 22 Drawing Sheets

AUTOMATIC PAYMENT SYSTEM

CROSS-REFERENCE TO THE RELATED APPLICATIONS

This application is a continuation of patent application U.S. Ser. No. 17/349,945, filed on Jun. 17, 2021, which is hereby incorporated by reference in its entirety. In addition, patent application U.S. Ser. No. 17/349,945 is a continuation-in-part of international patent applications number PCT/KR2020/015775, filed on Nov. 11, 2020, and PCT/KR2019/014972, filed on Nov. 6, 2019, which are hereby incorporated by reference in their entirety. Further in addition, this application claims priority from Korean application number 10-2018-0162865, filed on Dec. 17, 2018, and Korean application number 10-2019-0130871, filed on Oct. 21, 2019, and Korean application number 10-2019-0151241, filed on Nov. 22, 2019, and Korean application number 10-2020-0149332, filed on Nov. 10, 2020.

BACKGROUND OF THE DISCLOSURE

Field of the Disclosure

The present disclosure relates to a payment system and, more particularly, to an automatic payment system including a camera.

Related Art

Currently, most products that customers want to purchase at stores such as a supermarket or a discount store are recognized through barcodes attached to the products. A POS system including a barcode scanner and a computer is generally used to recognize such products. Such a POS system is generally used as a very useful system by quickly and accurately calculating the prices of products to be purchased by customers in cooperation with a computer. Such a POS system recognizes products from the barcodes attached to the products, using a barcode scanner as the input device of a computer, thereby determining the prices of the products.

However, even if using such a POS system, there is a need for a person who has to read out the barcodes on products using the barcode scanner, which accounts for a large part of the resource for running a store.

In addition, in general, a store may be equipped with a point-of-sales (POS) terminal to establish a store management system for card payment, sales settlement, inventory management, and other functions necessary for store operation and management. In order to perform such store management more efficiently, many stores may store each customer's mileage accumulation and each customer's product purchase list together with the customer's personal information.

Meanwhile, a camera capturing an image in the store may be installed in many stores, and a user may thus check a theft, which may occur in the store using a captured image of the camera, or a store state. However, it may be bothersome to check every captured image of the camera in order to find the captured image of a desired situation such as the theft. In addition, even though the user finds the captured image of the desired situation, it may be difficult to identify who the corresponding customer is due to a poor quality of the image. If the image capture is performed with a high quality to enable more accurate customer identification, a storage space for storing the captured image may increase. However, given limited resources, this method may be inappropriate.

The above description is provided only to help understand the background of the spirits of the present disclosure, so it should not be understood as a matter corresponding to the prior art known to those skilled in the art.

SUMMARY

Embodiments of the present disclosure provide an automatic payment system that can recognize an ID of a product like a barcode without a person. For example, the automatic payment system includes a camera and an ID sensor, can recognize products from images taken by the camera, can determine whether the ID of the recognized products are sensed by the ID sensor, and can inform a user of products of which the IDs have failed to be sensed in accordance with the determination result.

Also, embodiments of the present disclosure provide a camera control device using a smaller space to store an image signal while having an improved quality of the image signal capturing a person who picks up a product, and an operation method thereof.

Also, embodiments of the present disclosure provide an automatic payment system that can store high-quality captured image data so that suspicious customers can be easily identified in a state of theft or the like based on payment information from the automatic payment system and images of a camera capturing the inside of the store.

An automatic payment system according to an embodiment of the present disclosure includes: first and second conveyer stages arranged along a conveying route on which products are moved; a slope disposed between the first and second conveyer stages on the conveying route; at least one first ID sensor facing the first conveyer stage to sense IDs attached to the products when the products overlap the first conveyer stage; at least one second ID sensor facing the second conveyer stage to sense IDs attached to the products when the products overlap the second conveyer stage; and a bottom ID sensor facing the conveyer route under the slope.

The first and second conveyer stages may include conveyer belts for moving the products, and the slope may include a transparent member provided as a part of the conveyer route between the conveyer belts.

The automatic payment system may further include a sensor disposed on the first conveyer stage and configured to generate a trigger signal by sensing the products entering the conveying route.

The automatic payment system may further include a controller configured to control the at least one first ID sensor, the at least one second ID sensor, the bottom ID sensor, and the sensor configured to generate the trigger signal.

The controller may be configured to map an ID sensed by the at least one first ID sensor and an ID sensed by the at least one second ID sensor to the trigger signals.

The automatic payment system may include: at least one main camera configured to provide an image by taking a picture of at least a portion of the conveying route; and a display device. The controller may be configured to sense objects corresponding to the products, respectively, from the image, map the sensed objects to the trigger signals, and display an object of a trigger signal failing to be matched to an ID of the sensed objects on the display device.

The conveyer stages may have different conveying speeds.

An automatic payment system according to an another embodiment of the present disclosure includes: first and second conveyer stages arranged along a conveying route on which products are moved; a slope disposed between the first and second conveyer stages on the conveying route; at least one first ID sensor facing the first conveyer stage to sense IDs attached to the products when the products overlap the first conveyer stage; at least one second ID sensor facing the second conveyer stage to sense IDs attached to the products when the products overlap the second conveyer stage; a bottom ID sensor facing the conveyer route under the slope; at least one camera configured to provide an image by taking a picture of at least a portion of the conveying route and a sales stand on which the products are displayed; and a controller configured to control the at least one first ID sensor, the at least one second ID sensor, the bottom ID sensor, and the at least one camera, and generate payment information for the products based on at least one of the detection signals received from the at least one first ID sensor, the at least one second ID sensor, the bottom ID sensor, and the at least one camera, wherein the controller is configured to allow: a first image captured at a first frame rate to be received by the at least one camera; a human object to be detected from the first image; an event signal to be generated when it is detected that the products are picked up by the human object from the first image; a second image including the human object to be acquired by controlling the at least one camera to capture the image at a second frame rate higher than the first frame rate in response to the event signal; and the payment information and the second image to be stored in a database.

The controller may be configured to allow: information related to the products to be generated; the second image to be converted to a third image of a third frame rate, and the payment information and the third image to be stored in the database when the related information matches the payment information; and the payment information and the second image to be stored in the database when the related information does not match the payment information, wherein the third frame rate is lower than the second frame rate.

The controller may be configured to allow the related information to be generated by performing image analysis on the first image.

The controller may be configured to allow the first image and at least one of the related information to be further stored in the database.

The automatic payment system may further include a sensor disposed on the first conveyer stage and configured to generate a trigger signal by sensing the products entering the conveying route.

The controller may be configured to map an ID sensed by the at least one first ID sensor and an ID sensed by the at least one second ID sensor to the trigger signals.

According to an another embodiment of the present disclosure, a computer device communicating with at least one camera through a network, includes: a communicator; and a processor configured to communicate with the at least one camera through the communicator, wherein the processor is configured to allow: a first image captured at a first frame rate to be received by the at least one camera; a human object to be detected from the first image; an event signal to be generated when it is detected that a product object is picked up by the human object after the human object is detected from the first image; and a second image including the human object to be acquired by controlling the at least one camera to capture the image at a second frame rate higher than the first frame rate in response to the event signal.

The processor may be configured to allow: payment information to be received from an external point-of-sales (POS) device through the communicator; and the payment information and the second image to be stored in a database.

The processor may be configured to allow: payment information to be received from an external point-of-sales (POS) device through the communicator; information related to the detected product object to be generated; the second image to be converted to a third image of a third frame rate depending on whether the related information matches the payment information, the third frame rate being lower than the second frame rate; and the payment information and the third image to be stored in a database.

The processor may be configured to allow: the payment information and the third image to be stored in the database when the related information matches the payment information; and the payment information and the second image to be stored in the database when the related information does not match the payment information.

The processor may be configured to allow the first image and at least one of the related information to be further stored in the database.

The processor may be configured to allow the related information to be generated by performing image analysis on the first image.

The processor may be configured to allow: first metadata including information on the gender and age of the human object to be generated by performing face recognition on the human object; second metadata including information on a product that the human object is interested in to be generated by performing at least one of an eye tracking and a head direction tracking on the human object; and the first and second metadata to be stored in the database by relating the first and second metadata to the second image signal.

According to embodiments of the present disclosure, the present disclosure may provide an automatic payment system that can recognize the IDs of products such as barcodes even without a person.

According to embodiments of the present disclosure, the present disclosure may provide the camera control device using a smaller space to store the image signal while having an improved quality of an image signal capturing a person who picks up a product and, and the operation method thereof.

Also, according to embodiments of the present disclosure, the present disclosure may provide an automatic payment system capable of storing high-quality captured image data to easily identify a suspicious customer in a state such as theft based on the payment information for the product and the image of the camera capturing the inside of the store.

DESCRIPTION OF EXEMPLARY EMBODIMENTS

Hereafter, preferable embodiments according to the present disclosure are described in detail with reference to the accompanying drawings. It should be noted that, in the following description, only parts required to understand the operation according to the present disclosure are described and other parts are not described not to make the scope of the present disclosure unclear. Further, the present disclosure is not limited to the embodiments described herein and may be implemented by other ways. However, embodiments described herein are provided for those skilled in the art to easily achieve the spirit of the present disclosure.

Further, when an element is referred to as being "connected with" another element throughout the specification, it may be "directly connected" to the other element and may also be "electrically connected" to the other element with another element intervening therebetween. Terminologies used herein are used to describe specific embodiments without limiting the present disclosure. Through the present specification, unless explicitly described otherwise, "comprising" any components will be understood to imply the inclusion of other components rather than the exclusion of any other components. "At least any one of X, Y, and Z" and "at least any one selected from a group of X, Y, and Z" may be construed as one table, one Y, one Z, or any combination of two or more of X, Y, and Z (e.g., XYZ, XYY, YZ, ZZ). Here, "and/or" includes all combinations of one or more of corresponding components.

Figure 1:
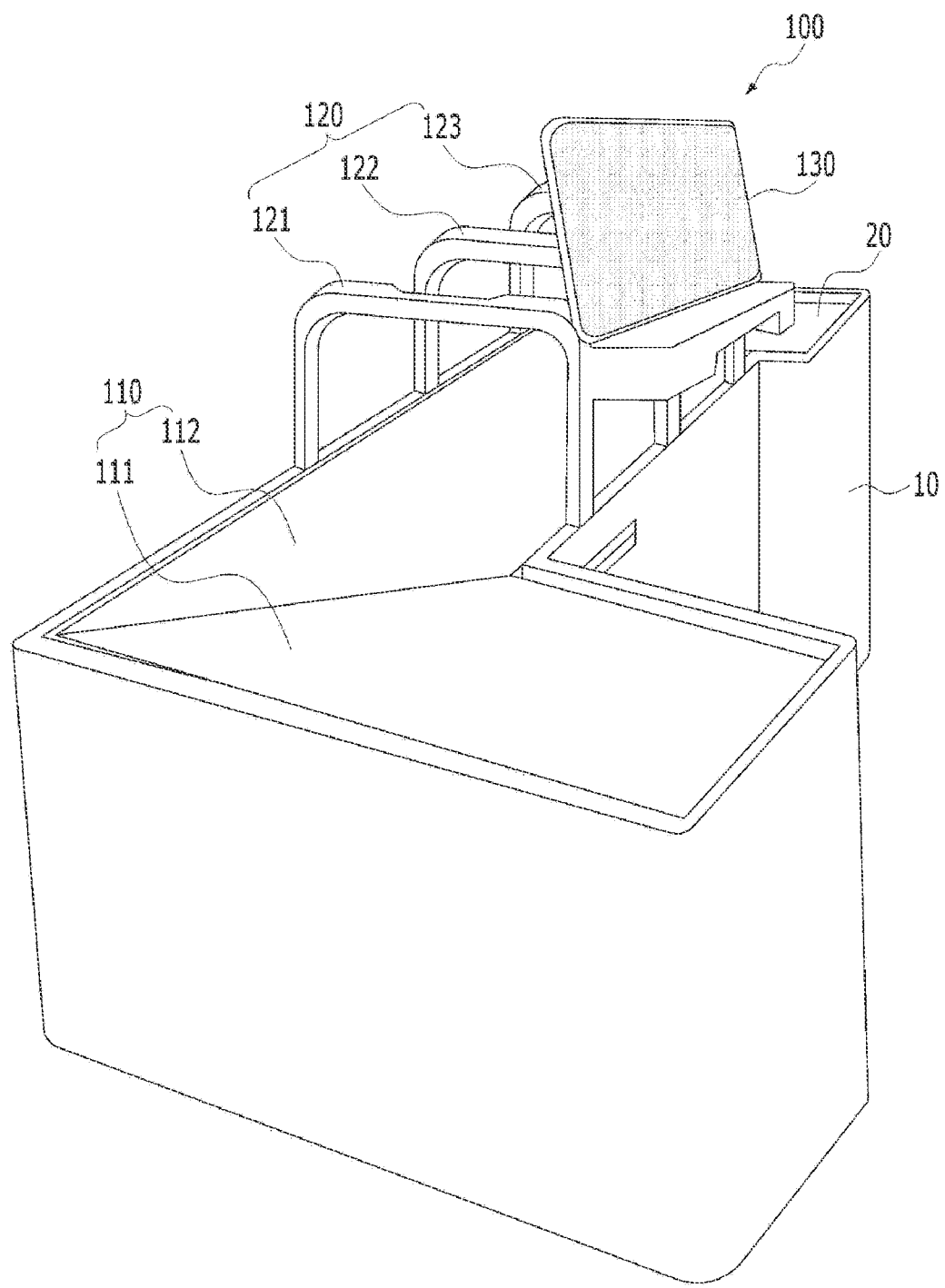
FIG. 1 is a perspective view showing an automatic payment system according to an embodiment of the present disclosure.

FIG. 1 is a perspective view showing an automatic payment system according to an embodiment of the present disclosure.

Referring to FIG. 1, an automatic payment system 100 may include a base 10, an outlet 20, a conveyer 110, a support 120, and a controller 130.

The base 10 includes a structure for supporting the conveyer 110 and the support 120 at a predetermined height from the ground.

The conveyer 110 is supported by the base 10 and is configured to convey products along a conveying route. The conveyer 110 may include a plurality of conveyer stages, for example conveyer belts continuously arranged along the conveying route. The conveyer stages may have different conveying speeds different from each other. It is exemplified in FIG. 1 that the conveyer 110 includes two conveyer stages 111 and 112. Accordingly, when a user puts down products on the first conveyer stage 111, the products can be moved to the outlet 20 through the first and second conveyer stages 111 and 112. While the products are moved to the outlet 20, the automatic payment system 100 can sense the IDs attached to the products. The sensed IDs can be used to pay for the products.

The support 120 is disposed to overlap the conveying route of the conveyer 110. The support 120 may have a shape suitable for supporting the controller 130. The support 120 can support cameras and ID sensors (see 140, 151~154, and 160 in FIG. 2). In embodiments, the support 120 may include a plurality of U-shaped frames 121~123), and the controller 130, cameras, and ID sensors may be installed on the plurality of frames 121~123.

The controller 130 is configured to control the cameras and ID sensors by communicating with them in a wired and/or wireless type.

Figure 2:
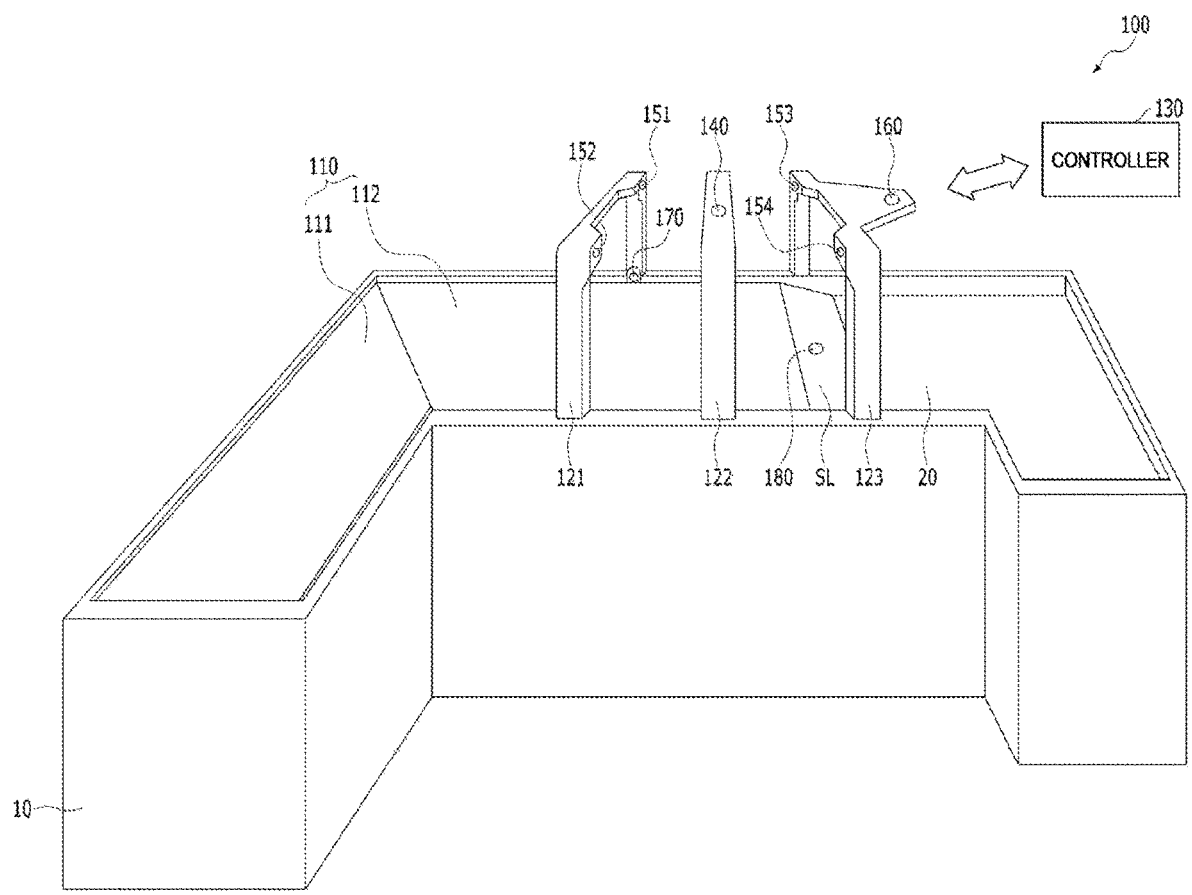
FIG. 2 is a perspective view showing the automatic payment system at an angle different from FIG. 1.
Figure 3:
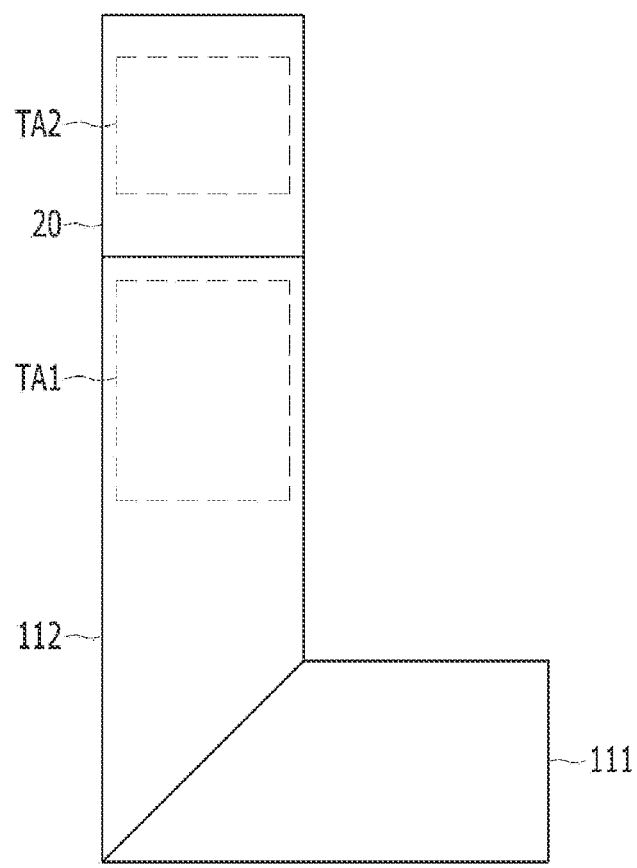
FIG. 3 is a plan view showing a conveyer and an outlet of the automatic payment system of FIG. 2.
Figure 4:
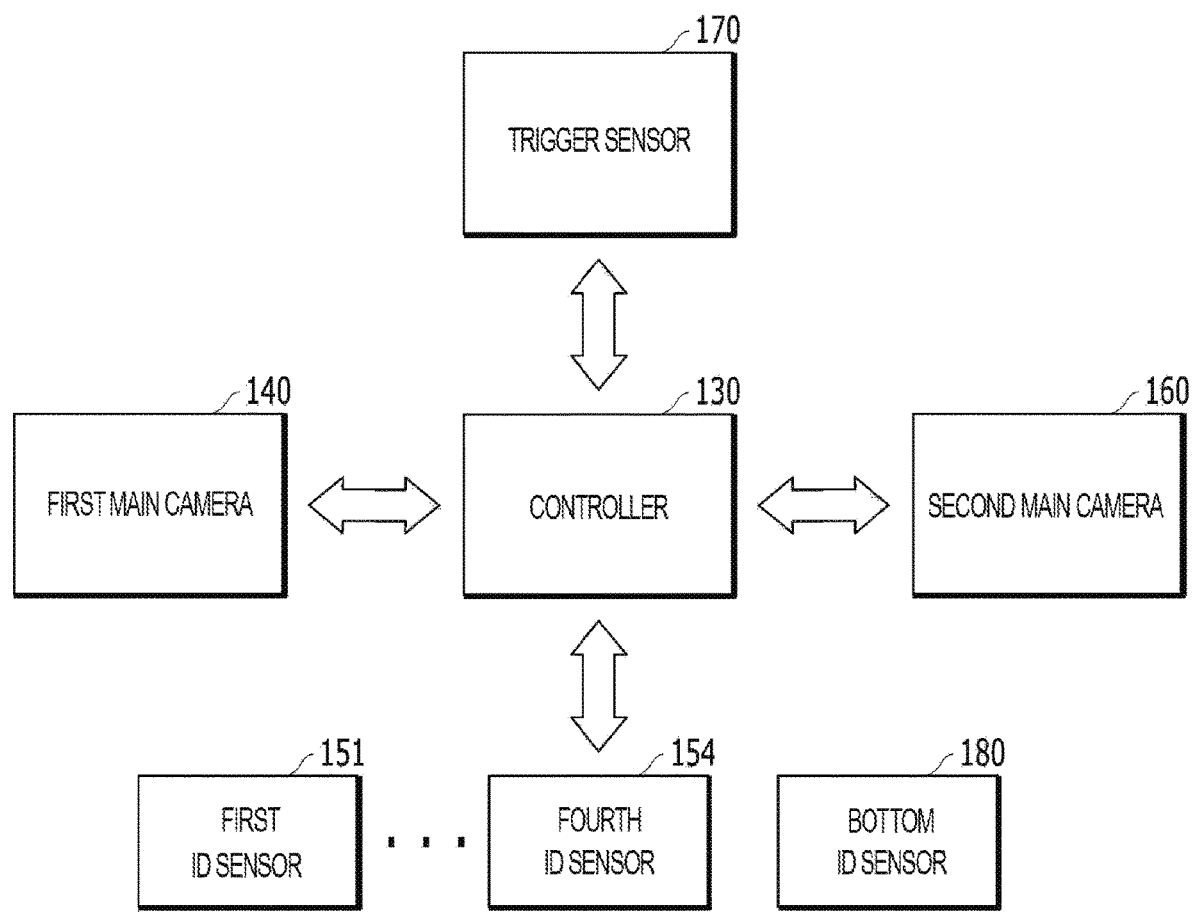
FIG. 4 is a block diagram showing an embodiment of the automatic payment system of FIG. 2.

FIG. 2 is a perspective view showing the automatic payment system at an angle different from FIG. 1. FIG. 3 is a plan view showing a conveyer and an outlet of the automatic payment system of FIG. 2. FIG. 4 is a block diagram showing an embodiment of the automatic payment system of FIG. 2.

Referring to FIGS. 2 to 4, in the conveyer 110, the first conveyer stage 111 conveys products at a first conveying speed and the second conveyer stage 112 conveys products at a second conveying speed higher than the first conveying speed. Accordingly, products can be spaced a predetermined distance or more apart from each other on the second conveyer stage 112. For example, when a user simultaneously puts products down on the first conveyer stage 111, the products can be moved with predetermined gaps therebetween on the second conveyer stage 112 due to the conveying speed of the second conveyer stage 112 that is higher than the first conveyer stage 111. Accordingly, products can be effectively recognized in an image taken by a first main camera 140 and the ID attached to products can be effectively sensed by first to fourth ID sensors 151~154.

The automatic payment system 100 may include a first main camera 140, a plurality of ID sensors 151~154, and a second main camera 160.

The first main camera 140 can take a picture of a first target area TA1 of the conveying route defined by the conveyer stages 111 and 112. The plurality of ID sensors 151~154 may face the first target area TA1 to be able to sense the IDs, for example, barcodes attached to products when the products overlap the first target area TA1 while moving along the conveying route. Although four ID sensors 151~154 are shown in FIGS. 2 to 4, the number of the ID sensors may depend on embodiments. In embodiments, the first to fourth ID sensors 151~154 each can take a picture and/or image and can extract and sense the IDs included in the taken picture and/or image. In embodiments, the first to fourth ID sensors 151~154 each may include a barcode scanner.

A second main camera 160 can take a picture of a second target area TA2 positioned after the first target area TA1 of the conveying route in response to control of the controller 130. In embodiments, a slope SL may be provided between the conveyer 110 and the outlet 20. In embodiments, the second target area TA2 may overlap the slope SL.

The first main camera 140, the plurality of ID sensors 151~154, and the second main camera 160 may be appropriately installed on the first to third frames 121~123 sequentially arranged. For example, the first main camera 140 may be installed on the second frame 122 between the first and third frames 121 and 123 to perpendicularly face the first target area TA1, and the second main camera 160 may be installed on the third frame 123 adjacent to the second target area TA2. Each of the plurality of ID sensors 151~154 may be installed on any one of the first to third frames 121~123, depending on embodiments.

The controller 130 can communicate with the first main camera 140, the first to fourth ID sensors 151~154, and the second main camera 160 in a wired and/or wireless type. The controller 130 can obtain an image of the first target area TA1 from the first main camera 140, can recognize products from the image of the first target area TA1, can determine whether the IDs (e.g., barcodes of the recognized products) are sensed by the first to fourth sensors 151~154, and can control the second main camera 160 to take images of products of which the IDs have failed to be sensed in accordance with the determination result. The controller 130 may include a display device for displaying the image taken by the second main camera 160, and accordingly, the controller 130 can inform a user of products of which the IDs have failed to be sensed. For example, a user can put down the products again on the conveyer 110. As described above, the automatic payment system 100 can recognize the IDs of product even without a person.

A trigger sensor 170 and a bottom ID sensor 180 may be further provided. The controller 130 can also communicate with the trigger sensor 170 and the bottom ID sensor 180. The trigger 170 is disposed adjacent to the first target area TA1 and can generate a trigger signal when sensing movement of each product. In embodiments, the trigger sensor 170 may be an infrared sensor, for example, an active infrared sensor. Trigger signals from the trigger sensor 170 enable the controller 130 to effectively recognize products in a first image. The controller 130 can determine whether there is a product of which the IDs have failed to be sensed by further referring to trigger signals.

The bottom ID sensor 180 may be disposed on the bottom supporting products between the first target area TA1 and the second target area TA2. The bottom ID sensor 180 may overlap the slope SL. Accordingly, the bottom ID sensor 180 can sense an ID when a product is moved with the ID facing down. The bottom ID sensor 180 can provide an additional opportunity to sense the IDs of products.

Figure 5:
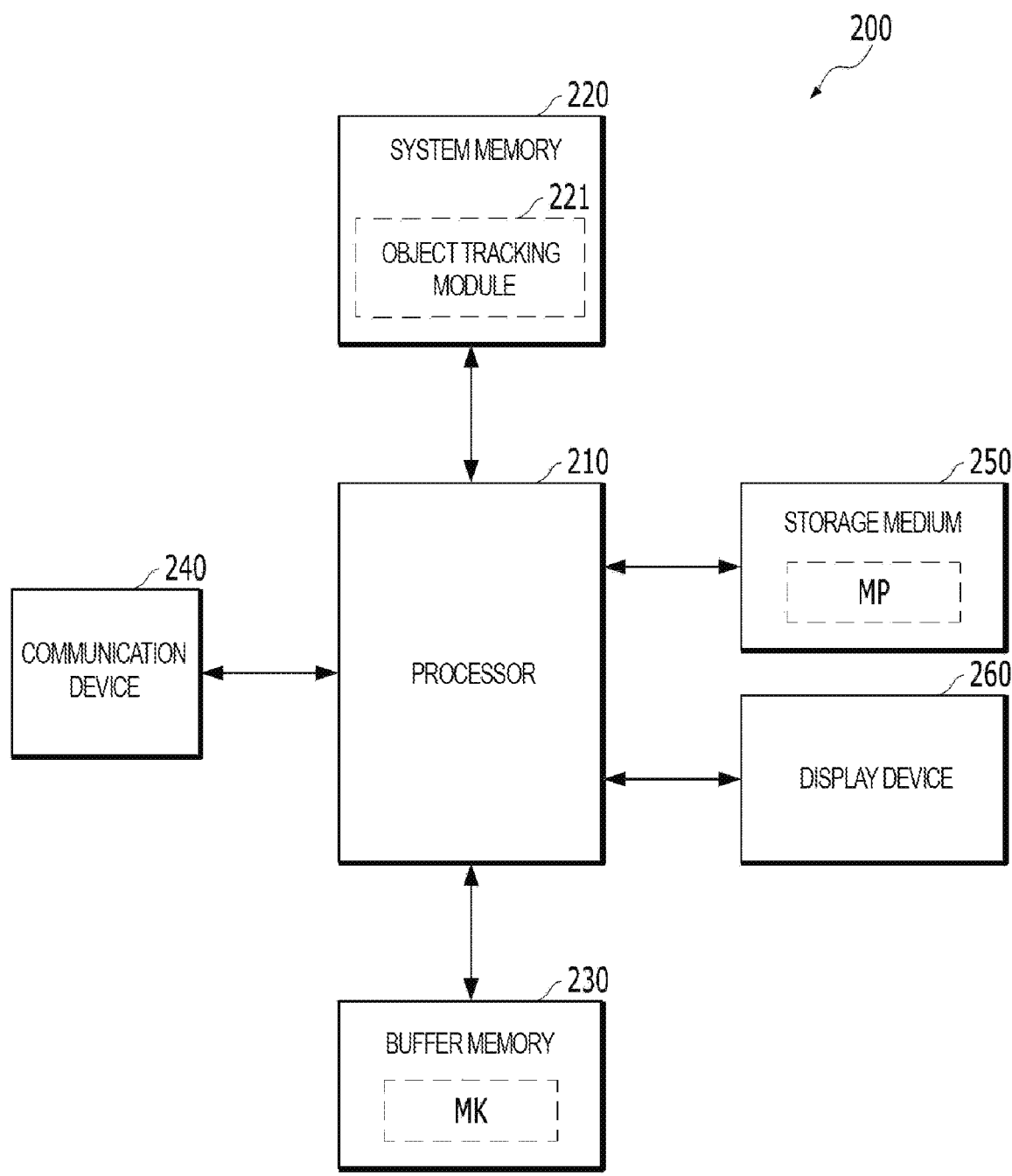
FIG. 5 is a block diagram showing an embodiment of a controller of FIG. 2.

FIG. 5 is a block diagram showing an embodiment of a controller of FIG. 2.

Referring to FIG. 5, the controller 200 may include a processor 210, a system memory 220, a buffer memory 230, a communication device 240, a storage medium 250, and a display device 260.

The processor 210 can load commands and/or program codes that cause the operations described herein of the controller 130 (see FIG. 2) and can execute the loaded commands and/or program codes. The processor 210 can load an object tracking module 221, which performs the operations of the controller 130 that are performed when it is executed by the processor 210, on the system memory 220, and can execute the loaded object tracking module 221. For example, the object tracking module 221 may be loaded on the system memory 220 from the storage medium 250.

The system memory 220 and the buffer memory 230 may include at least one of various types of memories such as SRAM (Static RAM), DRAM (Dynamic RAM), and SDRAM (Synchronous DRAM). The system memory 220 may be used as a working memory of the processor 210. At least a portion of the system memory 220 may be included in the processor 210 and used as a working memory. The buffer memory 230 may be provided as a component distinguished from the system memory 220. In other embodiments, the buffer memory 230 may be integrated with the system memory 220. The processor 210 can write and delete data, for example, a mark table MK on and from the buffer memory 230, if necessary. The mark table MK will be described in detail with reference to FIG. 6.

The communication device 240 can transmit/receive signals between the controller 200 and the first main camera 140, first to fourth ID sensors 151~154, second main camera 160, trigger sensor 170, and bottom ID sensor 180 in a wired and/or wireless type.

The storage medium 250 may include various types of storage media that keep the stored data even if power is cut, that is, storage media such as a flash memory and a hard disk. The storage media 250 can keep data for matching the range of the first main camera 140 and the ranges of the ID sensors. In embodiments, mapping data MP can store mapping data MP between the position values (e.g., coordinates) of a first image taken by the first main camera 140 and the position values (e.g., coordinates) of a second image taken by each of the ID sensors. The mapping data MP can be loaded on the system memory 220 and/or the buffer memory 230 by the processor 210.

The display device 260 is controlled by the processor 210 to display information that is processed by the controller 200. For example, the processor 210 can receive a picture and/or an image taken by the second main camera 160 and can display the received picture and/or image on the display device 260.

Figure 6:
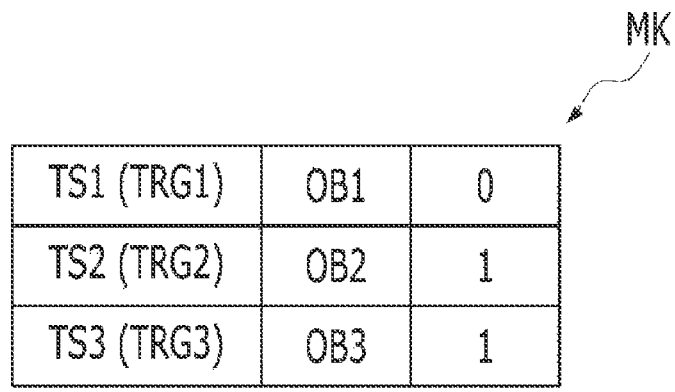
FIG. 6 is a view showing an embodiment of a mark table that is managed by the controller of FIG. 2.
Figure 7:
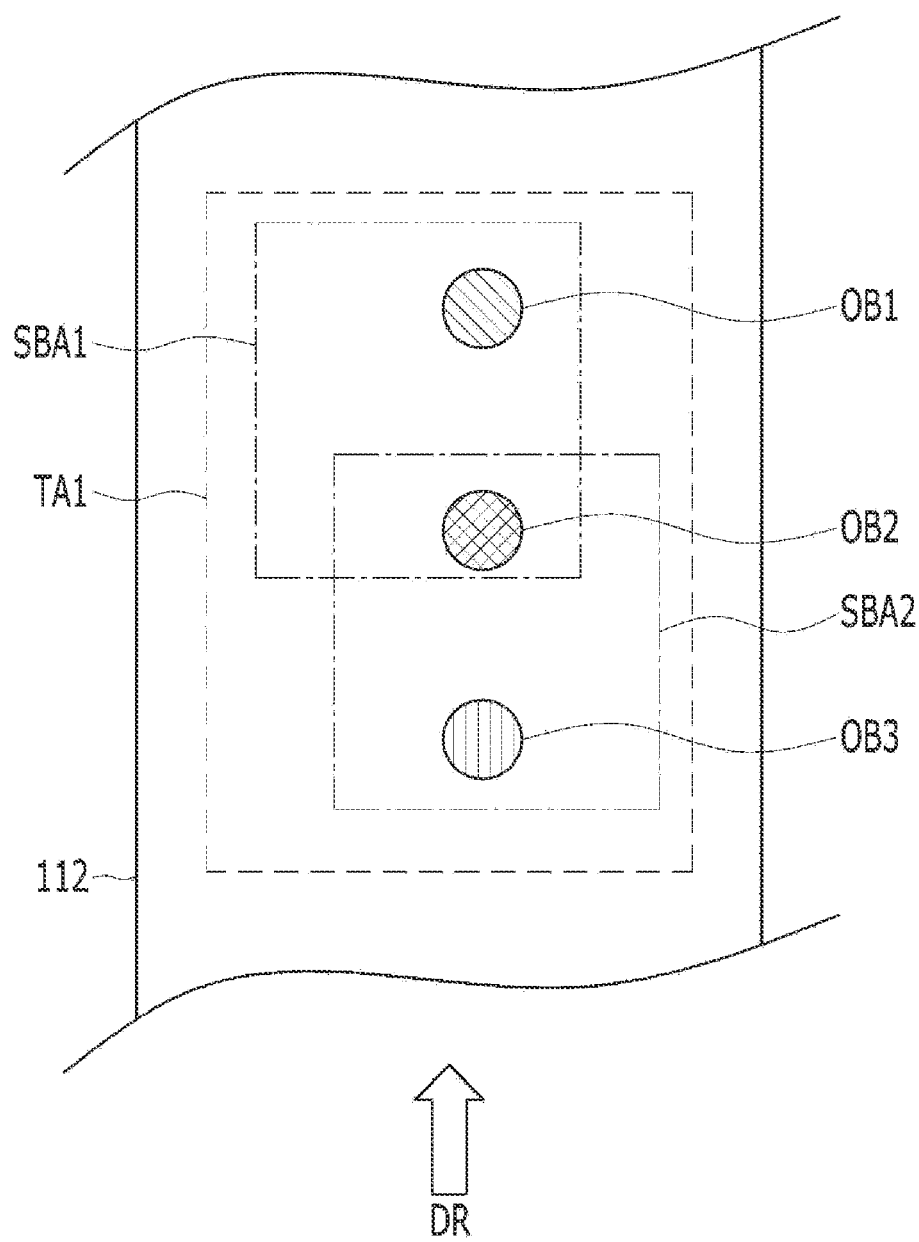
FIG. 7 is a plan view exemplarily showing a first target area and sub-areas on a conveying route.

FIG. 6 is a view showing an embodiment of a mark table that is managed by the controller of FIG. 2. FIG. 7 is a plan view exemplarily showing a first target area and sub-areas on a conveying route. It is assumed in the description referring to FIGS. 6 and 7 that three products are moved by the conveyer 110 for the convenience of description.

First, referring to FIG. 6 with FIG. 2, the controller 130 can create and manage the mark table MK. The mark table MK may include a time stamp TS, an identifier of on object OB, and a mark that correspond to each product.

The controller 130 can remove first to third trigger signals TRG1~TRG3 showing movement of products from the trigger sensor 170. In this case, the controller 130 can list first to third time stamps TS1~TS3 showing the times when the first to third trigger signals TRG1~TRG3 were created in the mark table MK. Hereafter, it is assumed that the first to third trigger signals TRG1~TRG3 are sequentially created.

The controller can map the IDs sensed by the first to fourth ID sensors 151~154 to the first to third trigger signals TRG1~TRG3. The controller 130 can update the marks of the trigger signals mapped to the sensed IDs. The controller 130 can recognize products from the image taken by the first main camera 140. The controller 130 may include at least one of various algorithms for recognizing and tracking products in the image such as the object tracking module 221 of FIG. 2, thereby being able to recognize first to third objects OB1~OB3 respectively corresponding to the products in the image taken by the first main camera 140. The controller 130 can effectively recognize the first to third objects OB1~OB3 by referring to the trigger signals TRG1~TRG3.

It is assumed that the first to third objects OB1~OB3 are sequentially recognized in the image taken by the first main camera 140. In this case, the controller 130 may put the first to third objects OB1~OB3 into the mark table MK such that the first to third objects OB1~OB3 correspond to the first to third time stamps TS1~TS3.

The mark table MK may further include marks corresponding to the recognized first to third objects OB1~OB3, respectively. It is exemplified that the marks corresponding to the first to third objects OB1~OB3, respectively, are "0", "1", and "1". Each mark may have a default of 0. The marks can be updated by the controller 130. The controller 130 can update a corresponding mark to "1" when an ID corresponding to each object is sensed by an ID sensor. Accordingly, the mark "0" may mean that the ID corresponding to the corresponding object has not been sensed by an ID sensor. When a corresponding mark has a default "0" even though an object has gone out of an image of the first main camera 140, the controller 130 can determine that the ID of the corresponding object has failed to be sensed. In FIG. 6, the controller 130 can determine that the ID of the first object OB1 having a mark "0" has failed to be sensed. The controller 130 can control the second main camera 160 to take a picture of the product corresponding to the first object OB.

Referring to FIG. 7 with FIG. 2, products are sequentially moved in a movement direction DR by the conveyer 110, for example, the second conveyer stage 1112. The first main camera 140 takes a picture of the first target area TA1. The controller 130 can recognize the first to third objects OB1~OB3 corresponding to the products in the image taken by the first main camera 140.

The first to fourth ID sensors 151~154 can take a picture of at least a portion of the first target area TA1 and can extract and sense IDs (e.g., barcodes) included in the taken picture and/or image. In FIG. 2, ranges that are taken by 2 ID sensors are shown for the convenience of description. For example, the second ID sensor 152 takes a picture of a first sub-area SBA1 in the first target area TA1 and the third ID sensor 153 takes a picture of a second sub-area SBA2 in the first target area TA1. When the ID of a product is sensed, each of the ID sensors can transmit the position information of the ID sensed in the range of the corresponding ID sensor to the controller 140.

The controller 130 can recognize objects, of which the IDs have failed to be sensed, of the first to third objects OB1~OB3 on the basis of the position information received from the ID sensors. The controller 130, as described with reference to FIG. 5, can store mapping data MP between the range (e.g., TA1) of the first main camera 140 and the ranges (e.g., SBA1 and SBA2) of the ID sensors. The controller 130 can convert the position information received from the sensors into position information in the range of the first main camera 140 and can update the marks of objects positioned in the converted position information of the first to third objects OB1~OB3. As described above, the marks corresponding to the first to third objects OB1~OB3, respectively, in the mark table MK of FIG. 6 can be updated.

In other embodiments, the controller 130 can map an ID to a trigger signal (or an object) on the basis of the time when the ID was sensed. The controller 130 can recognize a trigger signal corresponding to an ID on the basis of the time when the ID was sensed, and can update the mark corresponding to the recognized trigger signal. For example, the ID sensors can sense an ID after a corresponding time passes from the point in time when a trigger signal is generated. In this case, when an ID sensor senses an ID, the controller 130 can recognize a trigger signal having a time stamp created before the elapsed time corresponding to it from the point in time of sensing, and can update the mark corresponding to the recognized trigger signal.

Figure 8:
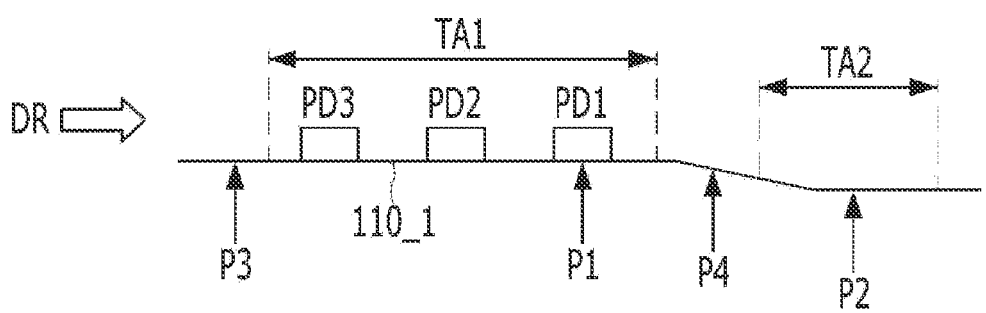
FIG. 8 is a side view exemplarily showing the first target area and a second target area on the conveying route.

FIG. 8 is a side view exemplarily showing the first target area and a second target area on the conveying route.

Referring to FIGS. 2 and 8, first to third products PD1~PD3 are moved while being supported by the bottom 110_1 of the conveyer 110. The first to third products PD1~PD3 may correspond to the first to third objects OB1~OB3 of FIG. 7, respectively.

According to the mark table MT of FIG. 6, the ID of the first object OB1 having the mark "0", that is, the first product PD1 fails to be sensed. The controller 130 can control the second main camera 160 to take a picture of the first product PD1 when the first product PD1 reaches the second target area TA2. In embodiments, the controller 130 can determine the point of time when the second main camera 150 takes a picture of the first product PD1 with reference to the distance between position P1 of the first product PD1 and a predetermined position P2 in the second target area TA2 and the conveying speed of the conveyer 110. The position P1 of the first product PD1 may be determined in accordance with the position value of the first object OB1 in the image of the first main camera 140. In embodiments, the controller 130 can determine that the point in time when the first object OB1 goes out of the image of the first main camera 140 or the point in time when a predetermined elapses from a point in time in a time range similar to it as the point in time when the second main camera 160 takes a picture. The predetermined elapsed time may be determined with reference to the conveying speed of the conveyer 110.

In other embodiments, the function of the second main camera 160 may be performed by the first main camera 140 and the second main camera 160 may be omitted. For example, it is possible to inform a user of the product of which the ID has failed to be sensed by displaying a picture and/or image of the first target area TA1 taken by the first main camera 140 on the display device. As another example, the controller 130 can inform a user of the product of which the ID has failed to be sensed by displaying the picture and/or image of the second target area TA2 taken by the first main camera 160 on the display device. In this case, the first main camera 140 may be installed to have a larger field of view or to photograph and/or face a wider area, thereby being able to take a picture of not only the first target area TA1, but the second target area TA2.

As described with reference to FIG. 2, the automatic payment system 100 may include a trigger sensor 170 and a bottom ID sensor 180. The trigger sensor 170 may face the conveyer 110, particularly, the area that overlaps the second conveyer stage 112. For example, the trigger sensor 170 may be disposed at a third position P3 adjacent to the first target area TA1. The bottom ID sensor 180 may be disposed at a fourth position P4 between the first target area TA1 and the second target area TA2 and can sense the IDs on the bottom of products.

The ID of any one of the first to third products PD1~PD3 can be sensed by the bottom ID sensor 180. In this case, the controller 130 can update the mark table MK in accordance with whether the bottom ID sensor 180 senses an ID at a point in time when a predetermined time has passed or at a point in time in a time range similar to it from any one of time stamps TS1~TS3. In FIG. 6, the first time stamp TS1 corresponds to the first object OB1 and the mark "0". When the bottom ID sensor 180 senses an ID at a point in time when a predetermined time has passed from the first time stamp TS1, the mar of the first object can be updated into "1". Accordingly, the marks of all of the first to third objects OB1~OB3 are T, which means that the IDs of all of the first to third objects OB1~OB3 has succeeded to be sensed. In this case, the controller 130 may not trigger photographing of the second main camera 160. If the point in time when the bottom ID sensor 180 sensed an ID is a point in time after a predetermined time elapses from any one of other time stamps TS2 and TS3 rather than the first time stamp TS1, the corresponding marks are already "1", so the mark table MK is not updated. This means that even though the first product PD1 has passed the area where the bottom ID sensor 180 is positioned, the ID thereof has failed to be sensed. In this case, the controller 130 may trigger photographing of the second main camera 160.

Figure 9:
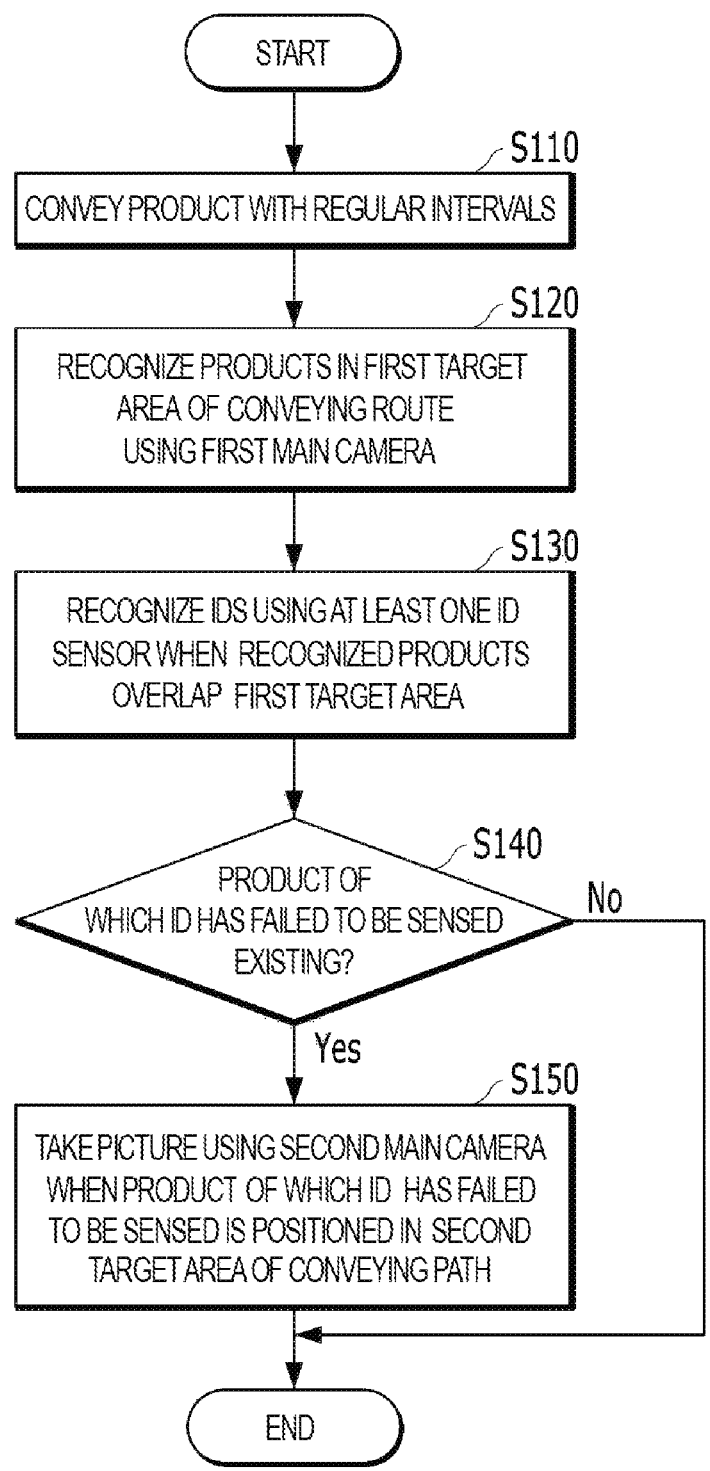
FIG. 9 is a flowchart showing a method of operating an automatic payment system according to an embodiment of the present disclosure.

FIG. 9 is a flowchart showing a method of operating an automatic payment system according to an embodiment of the present disclosure.

Referring to FIGS. 2 to 9, in step S110, the automatic payment system 100 conveys product with regular intervals therebetween.

In step S120, the automatic payment system 100 recognizes products in the first target area on the conveying route using the first main camera 140. The controller 130 may include at least one of various algorithms for recognizing and tracking product sin images.

In step S130, the automatic payment system 100 recognizes IDs using at least one ID sensors 151~154 when the recognized products overlap the first target area.

In step S140, the automatic payment system 100 performs step S150 when a product of which the ID has failed to be sensed exists. The automatic payment system 100 stores mapping data for matching the range of the first main camera 140 and the routes of the ID sensors. The ID sensors may provide the position of an ID recognize in the ranges thereof when sensing IDs to the automatic payment system 100. By referring to the mapped data and the provided position information, the automatic payment system 100 can determine whether the IDs of the products recognized in the image of the first main camera 140 have succeeded to be sensed. If a product of which the ID has failed to be sensed exists, step S150 is performed.

In step S150, the automatic payment system 100 takes a picture using the second main camera when the product of which the ID has failed to be sensed is positioned in the second target area after the first target area in the conveying route.

Figure 10:
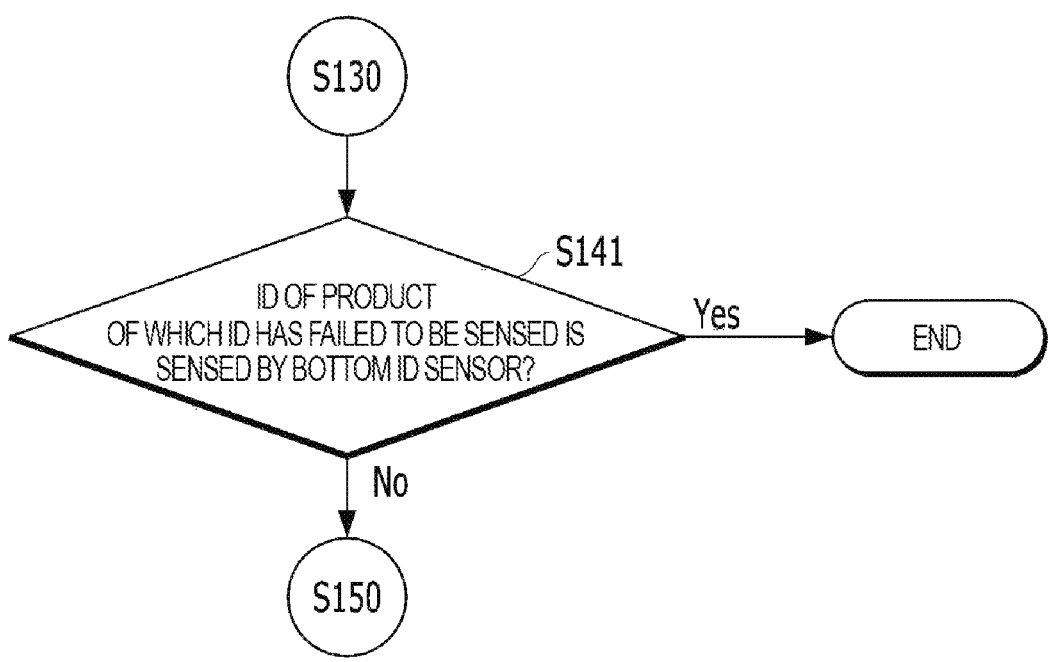
FIG. 10 is a flowchart showing an embodiment of step S410 of FIG. 9.

FIG. 10 is a flowchart showing an embodiment of step S410 of FIG. 9.

Referring to FIGS. 2 and 10, the automatic payment system 100 can additionally determine whether the ID of the product of the ID has failed to be sensed in step S140 of FIG. 9 is sensed by the bottom ID sensor 180. In embodiments, this may be determined in accordance with the time stamps TS1~TS3 of the mark table described with reference to FIG. 6 and the point in time when the ID is sensed by the bottom ID sensor 180. Depending on the determination result, the automatic payment system 100 may perform step S150 of FIG. 9.

Figure 11:
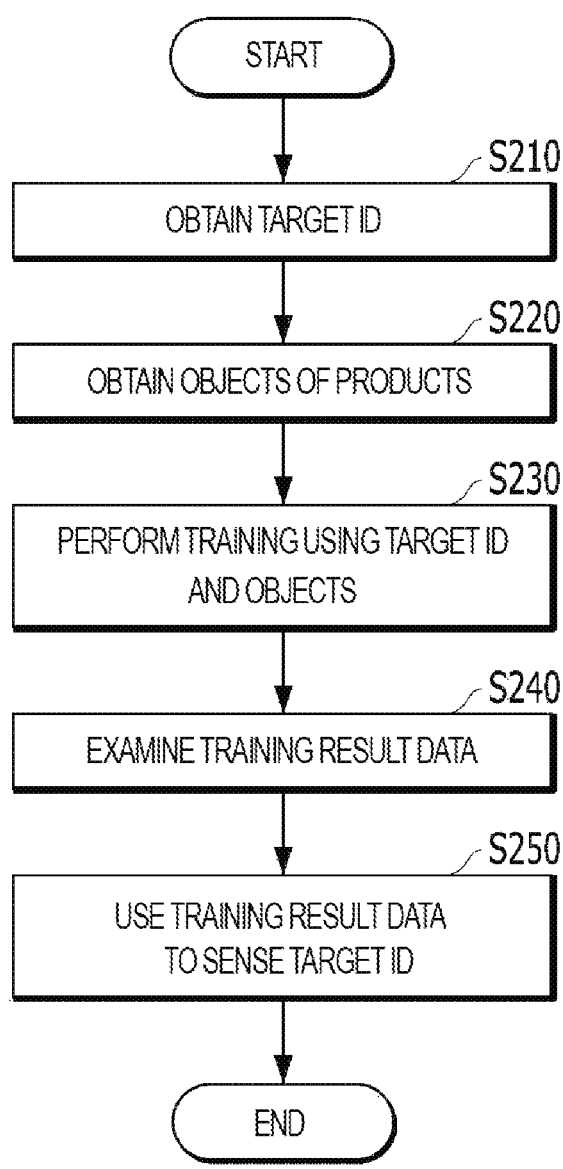
FIG. 11 is a flowchart showing a training method using an ID and a product object obtained by the automatic payment method of FIG. 9.

FIG. 11 is a flowchart showing a training method using an ID and a product object obtained by the automatic payment method of FIG. 9.

Referring to FIG. 11, in step S210, IDs sensed by 151~154 and 180 are obtained as target IDs. In step S220, the objects of the products recognized by the first and second main cameras 140 and 160 are obtained.

In step S230, training (or deep learning) is performed using the target IDs and the objects. This training may be performed by learning and accumulating data for estimating the relevance between the target IDs and the objects on the basis of various algorithms and technologies known in the art.

In step S240, the training result data are examined. For example, the object of a target ID is obtained, an ID corresponding to the newly obtained object is estimated using the training result data, and training result data can be examined in accordance with whether the estimated ID is the same as a target ID. If IDs of a ratio higher than a critical value of IDs estimated in accordance with newly obtained objects are the same as a target ID, training result data may not be examined.

In step S250, the training result data may be used to sense a target ID. The IDs corresponding to products, respectively, may be sensed by cameras such as the first and second cameras 140 and 160 by repeatedly performing steps S210 to S240, and it may not be required to attach IDs (e.g., barcodes) to products. Accordingly, convenience for a user is improved.

Figure 12:
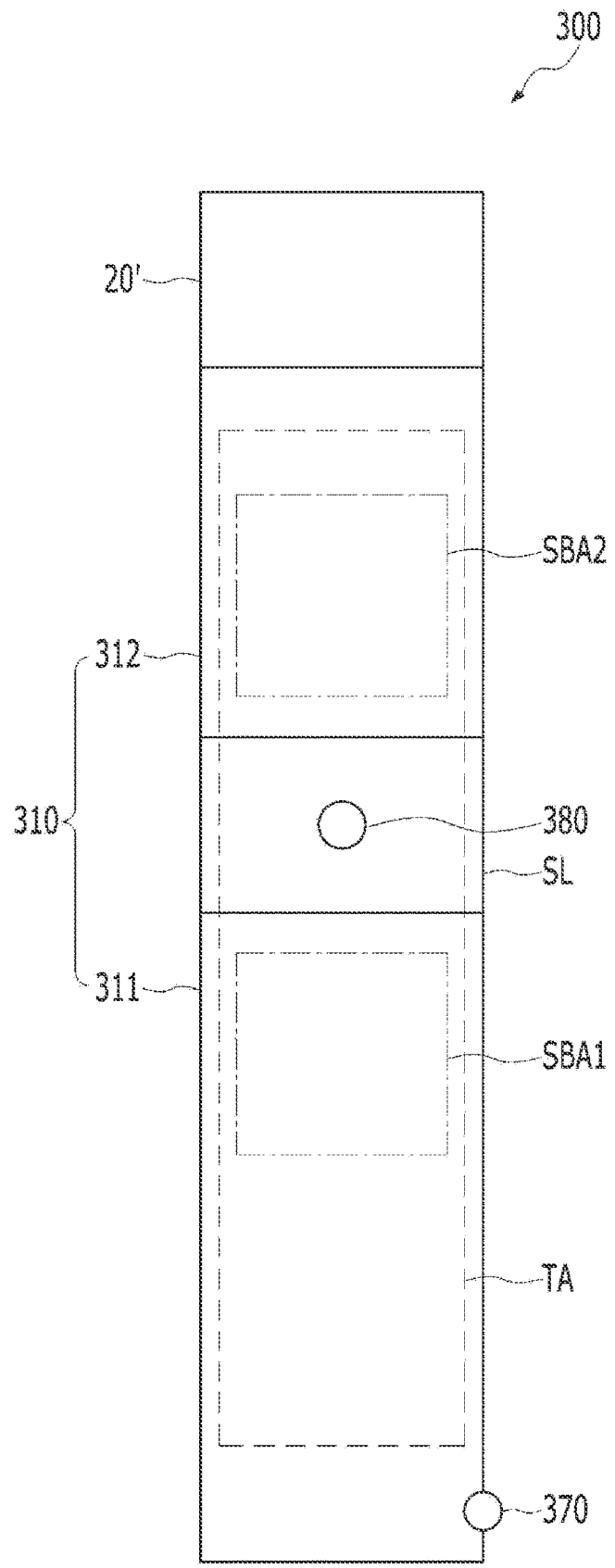
FIG. 12 is a plan view showing a conveyer and an outlet of an automatic payment system according to another embodiment of the present disclosure.
Figure 13:
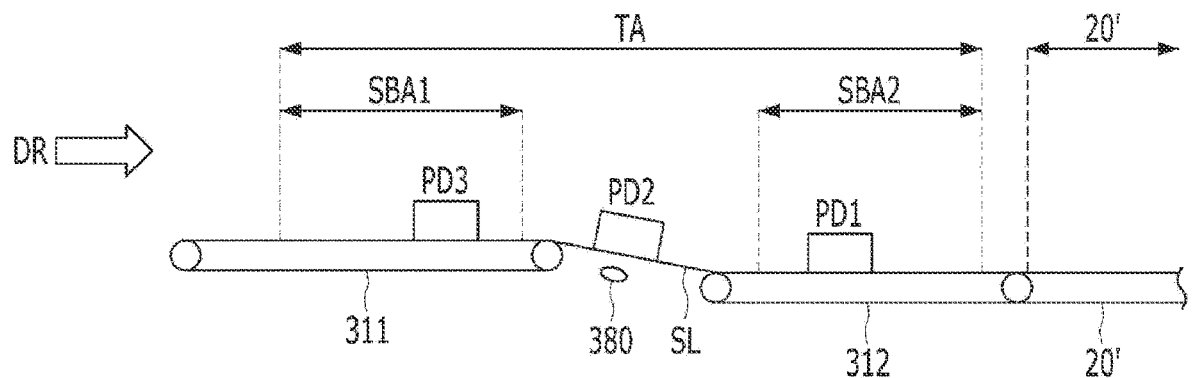
FIG. 13 is a side view showing a target area and an outlet on a conveying route of the automatic payment system of FIG. 12.

FIG. 12 is a plan view showing a conveyer and an outlet of an automatic payment system according to another embodiment of the present disclosure. FIG. 13 is a side view showing a target area and an outlet on a conveying route of the automatic payment system of FIG. 12.

First, referring to FIG. 12, an automatic payment system 300 may include a conveyer 310 and an outlet 20'. Though not shown in FIG. 12, the automatic payment system 300, similar to the automatic payment system 100 of FIG. 2, may include a controller, at least one camera, a plurality of ID sensors, and a trigger sensor, and these components may operate similar to that described with reference to FIGS. 2 to 8. Hereafter, repeated description is omitted.

A conveyer 310 may include a first conveyer stage 311, a second conveyer stage 312, and a slope SL. The first and second conveyer stages 311 and 312 may include conveyer belts for conveying products, for example, first to third products PD1~PD3 at predetermined conveying speeds. In embodiments, the first and second conveyer stages 311 and 312 can convey products at the same speeds. In other embodiments, the first and second conveyer stages 311 and 312 may convey products at different speeds.

A main camera can take a picture of at least a portion of the conveyer 310, that is, a target area TA. A plurality of ID sensors may face the target area TA to sense IDs attached to the products positioned in the target area TA.

The plurality of ID sensors may include ID sensors of a first group related to a first sub-area SB1 overlapping the first conveyer stage of the target area TA, and ID sensors of a second group related to a second sub-area SBA2 overlapping the second conveyer stage 312 of the target area TA. The ID sensors of the first group can sense IDs by taking a picture of products positioned in the first sub-area SBA1, for example, a third product PD3 when products overlap the first sub-area SBA1, and the ID sensors of the second group can sense IDs by taking a picture of products positioned in the second sub-area SBA2, for example, a first product PD1 when products overlap the second sub-area SBA2.

The ID sensors of the first and second groups may be installed at various positions to face various directions in consideration of barcodes can be attached at various positions on products. For example, the ID sensors of the first and second groups may include ID sensors disposed over the conveyer 310 similar to the first to fourth ID sensors 151~154 shown in FIG. 2. The ID sensors of the first and second groups may include ID sensors disposed on sides of the conveyer 310. Mirror members may be provided in order to increase the fields of view of the IDs disposed on the sides, and the ID sensors on the sides can take a picture of barcodes by receiving light coming out of products and reflected by the mirror members. The number of the ID sensors of the first and second groups may depend on embodiments.

Next, referring to FIG. 13 with FIG. 12, the first and second conveyer stages 311 and 312 have different heights and a slope LS may be disposed between the first and second conveyer stages 311 and 312. The slope SL may include a transparent member and/or substance. For example, the slope SL may be made of glass. The slope SL may overlap the target area TA between the first and second conveyer stages 311 and 312. The specification of the slope SL may be changed in various ways, depending on embodiments. For example, the slope SL may have different inclinations, different widths and lengths, and different ratios to the first and second conveyer stages 311 and 312, depending on embodiments.

An additional ID sensor 380 disposed under the slope SL and facing the conveying route may be provided and the bottom ID sensor 380 can sense the IDs of products when the products are moved with the IDs thereon facing down. For example, when the ID of a second product PD2 faces down, the bottom ID sensor 380 can sense the ID. As described above, the transparent slope SL and the bottom ID sensor 380 can provide an additional opportunity to sense IDs of products. Further, the slope SL disposed between the first and second conveyer stages 311 and 312, for example, rolls products moved by the first conveyer stage 311, thereby being able to provide an opportunity for the IDs to face another direction. Accordingly, even if an ID fails to be sensed on the first conveyer stage 311, the slope SL can increase the possibility that the ID of the corresponding product succeeds to be sensed on the second conveyer stage 312.

In embodiments, the speeds of the first and second conveyer stages 311 and 312 may be changed in consideration of the number of products, the kinds of products, the shapes of products, the sizes of products, and the supply time intervals of products. Further, the speeds of the first and second conveyer stages 311 and 312 may be changed may be changed in accordance with the result of sensing IDs and the probability of succeeding in sensing IDs according to the embodiments described above. The speeds of the first and second conveyer stages 311 and 312 may be controlled by a controller (e.g., the controller 130 of FIG. 3).

Figure 14:
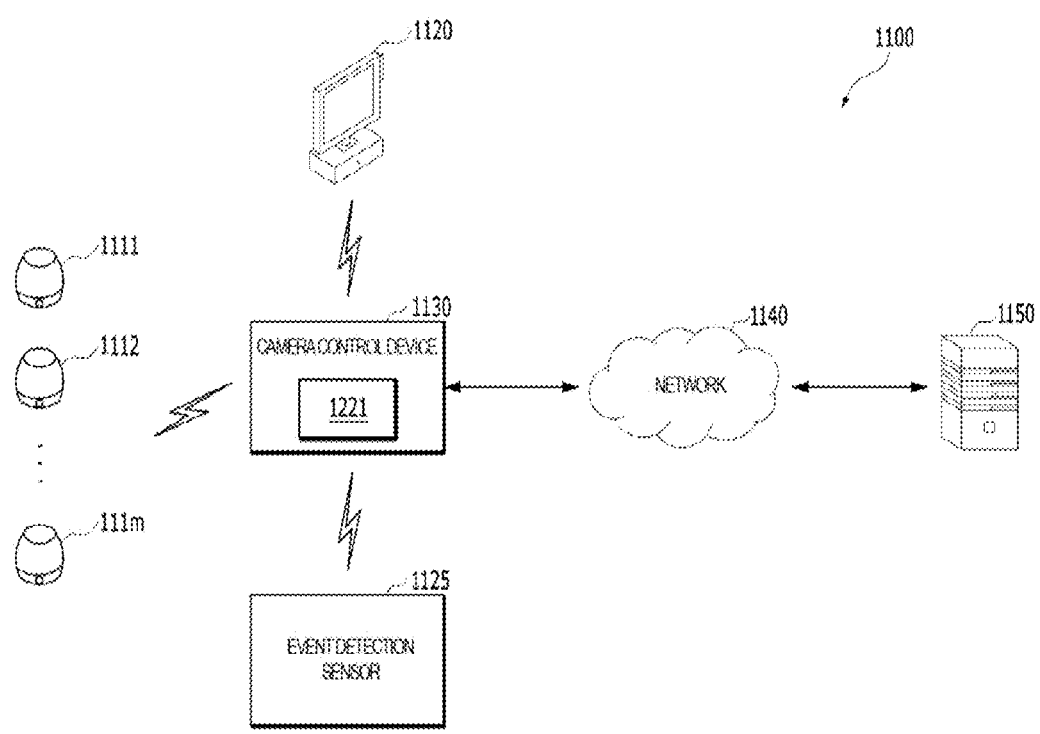
FIG. 14 is a block diagram showing an image capture system according to an exemplary embodiment of the present disclosure.

FIG. 14 is a block diagram showing an image capture system according to an exemplary embodiment of the present disclosure. The image capture system 1100 may include a plurality of devices, servers, and/or software components that are operated to perform methods according to the exemplary embodiments described herein. The devices and servers, shown in FIG. 14, may be disposed in different ways, and operations and services provided by such devices and/or servers may be coupled to or separated from each other to perform the exemplary embodiments described herein and may be performed by more or fewer devices and servers. One or more devices and/or servers may be driven by the same or different entities, e.g., companies.

Referring to FIG. 14, the image capture system 1100 may include one or more cameras 1111 to 111*m*, a point-of-sales (POS) device 1120, an event detection sensor 1125, a camera control device 1130, a network 1140 and a database server 1150.

First to m-th cameras 1111 to 111*m* may be configured to generate an image signal by capturing an image and to transmit the generated image signal to the camera control device 1130. The first to m-th cameras 1111 to 111*m* may each include, for example, an image sensor converting an optical signal input through a lens to an electronic signal, and a microphone converting a voice to an electronic signal, thereby providing the image signal and a voice signal. The image signal and the voice signal may configure multimedia data, and such multimedia data may be transmitted to the camera control device 1130. In the exemplary embodiments, the first to m-th cameras 1111 to 111*m* may each be an internet protocol (IP) camera.

The first to m-th cameras 1111 to 111*m* may each be properly installed to capture a desired target area, and in an exemplary embodiment, it may be assumed that the cameras are installed throughout the store. For example, the target areas of the first to m-th cameras 1111 to 111*m* may be areas adjacent to a sales stand, the POS device 1120 and the like, installed in the store.

At least one event detection sensor 1125 may be installed at the sales stand. Like a pressure sensor (or pressure transducer) or a weight sensor, the event detection sensor 1125 may be configured to detect that a product displayed on the sales stand is moved or removed, i.e. the product is picked up by a person, and to generate a detection signal based thereon. The detection signal may include information related to the moved or removed product, such as information on the sales stand, information on products displayed on the sales stand, information on types of the product displayed on the sales stand, the identification number of the event detection sensor 1125, etc.

The POS device 1120 may be configured to generate payment information and transmit the generated payment information to the camera control device 1130. The POS device 1120 may generate the payment information when an item (e.g., product) handled by the store where the POS device is installed is paid. Such payment information may include various types of information such as a paid item, at least one category in which the paid item is included, a payment amount, and purchaser information such as the gender and age of the purchaser. The POS device 1120 may identify the item using an integrated circuit (IC) chip, a barcode and the like, attached to the item, the purchaser may request payment of the amount from the POS device 1120 using a payment method such as a credit card and an application installed on a mobile phone, and the POS device 1120 may communicate with a business server (not shown) through the network 1140 to inquire whether or not to approve the payment.

The first to m-th cameras 1111 to 111*m*, the POS device 1120 and the event detection sensor 1125 may each communicate with the camera control device 1130 through short-range wireless communication. For example, the short-range wireless communication may include Bluetooth, Wireless Fidelity (wifi) communication, LTE device-to-device (D2D) communication, near field communication (NFC), magnetic secure transmission (MST) communication, zigbee communication, infrared data association (IrDA) communication, ultra-wideband (UWB) communication, Ant+ communication, and/or communication using at least one communication protocol among the similar types. However, the exemplary embodiments of the present disclosure are not limited hereto. The first to m-th cameras 1111 to 111*m*, the POS device 1120, the event detection sensor 1125, and the camera control device 1130 may communicate with each other through different types of wired/wireless networks.

The camera control device 1130 may receive the image signal from the first to m-th cameras 1111 to 111*m*. The camera device 1130 may select at least one of the first to m-th cameras 1111 to 111*m*, and receive the image signal from the selected camera. For example, the camera device 1130 may include functions to activate and deactivate the image capturing of each camera. The camera control device 1130 may communicate with the database server 1150 through the network 1140 and store the received image signal in the database server 1150. The camera control device 1130 may further receive the payment information from the POS device 1120, relate the received payment information to the image signal, and then store the same in the database server 1150.

The network 1140 may connect the camera control device 1130 and the database server 1150 to each other. The network 1140 may include at least one of a public network, at least one private network, a wired network, a wireless network, another appropriate type of network, and combinations thereof. The camera control device 1130 and the database server 1150 may each include at least one of a wired communication function and a wireless communication function, and accordingly, may communicate with each other through the network 1140.

FIG. 14 shows that the database server 1150 is a component separate from the camera control device 1130, and the exemplary embodiments of the present disclosure are not limited hereto. At least a portion of the database server 1150 may be integrated into the camera control device 1130. In this case, the camera control device 1130 may store the image signal and the payment information in the internal database.

The camera control device 1130 may include a capture mode control module 1221 configured to adjust a frame rate such as the frame rate and/or resolution of the image captured by the first to m-th cameras 1111 to 111*m*. Hereinafter, for convenience of explanation, the exemplary embodiments of the present disclosure are described focusing on adjusting the frame rate of the image captured by the first to m-th cameras 1111 to 111*m*. However, the technical idea of the present disclosure may also be applied to controlling another factor, such as the resolution of the image captured by the first to m-th cameras 1111 to 111*m*.

The first to m-th cameras 1111 to 111*m* may each transmit the image signal to the camera control device 1130 by capturing the image at the frame rate of a default value. The capture mode control module 1221 may transmit a mode selection signal to the selected camera to increase its frame rate, and accordingly, the selected camera may transmit the image signal of the increased frame rate to the camera control device 1130.

Figure 15:
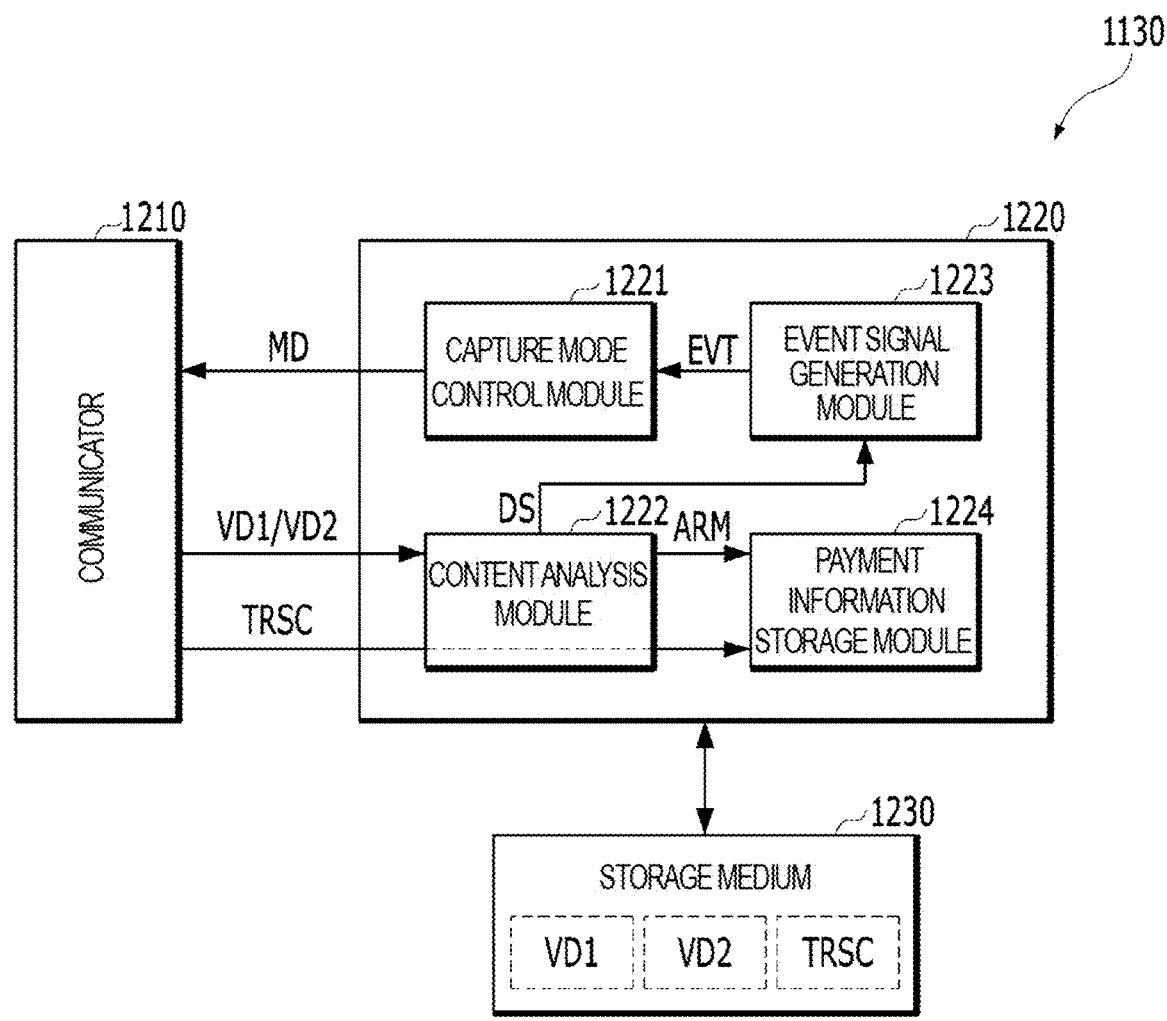
FIG. 15 is a block diagram showing the camera control device of FIG. 14 in more detail.

FIG. 15 is a block diagram showing the camera control device of FIG. 14 in more detail.

Referring to FIGS. 14 and 15, the camera control device 1130 may include a communicator 1210, a camera controller 1220 and a storage medium 1230.

In response to a control of the camera controller 1220, the communicator 1210 may be configured to perform communication with the first to m-th cameras 1111 to 111*m*, the POS device 1120, the event detection sensor 1125 and the database server 1150. The communicator 1210 may include the wired and wireless communication functions.

The camera controller 1220 may be connected to the communicator 1210 and the storage medium 1230. The camera controller 1220 may be configured to control an overall operation of the camera control device 1130. The camera controller 1220 may include the capture mode control module 1221, a content analysis module 1222, an event signal generation module 1223, and a payment information storage module 1224.

The capture mode control module 1221 may be configured to generate a mode selection signal MD in response to an event signal EVT provided from the event signal generation module 1223. For example, the capture mode control module 1221 may generate the mode selection signal MD when the event signal EVT is enabled. The generated mode selection signal MD may be transmitted to the selected camera through the communicator 1210, and the selected camera may increase its frame rate in response to the mode selection signal MD. That is, the first to m-th cameras 1111 to 111*m* may each capture the image at the first frame rate, and may capture the image at a second frame rate higher than the first frame rate when receiving the mode selection signal.

The content analysis module 1222 may receive an image signal of the first frame rate (hereinafter, first image signal VD1) and an image signal of the second frame rate (hereinafter, second image signal VD2) through the communicator 1210. Hereinafter, it may be assumed that the first and second image signals VD1 and VD2 are provided by the first camera 1111. The first camera 1111 may provide the first image signal VD1 before receiving the mode selection signal MD, and may provide the second image signal VD2 after receiving the mode selection signal. However, the exemplary embodiments of the present disclosure are not limited hereto. The first and second image signals VD1 and VD2 may be provided by the plurality of cameras. For example, the first image signal VD1 including a human object being tracked may be provided by the plurality of cameras, and the second image signal VD2 including the human object being tracked may also be provided by the plurality of cameras.

The content analysis module 1222 may be configured to detect the human object from the first image signal VD1. In the exemplary embodiments, the content analysis module 1222 may detect the human object from the first image signal VD1 through an algorithm such as a human detection algorithm.

The content analysis module 1222 may track the detected human object. The content analysis module 1222 may use at least one of various object tracking algorithms for tracking the human object. The content analysis module 1222 may identify the same human object in the first image signals VD1 of the different cameras through the object tracking algorithm, and track the identified human object. For example, the content analysis module 1222 may use a face detection algorithm. Various object tracking algorithms known in this field may be used, and the exemplary embodiments of the present disclosure are not limited hereto.

The content analysis module 1222 may store at least a portion of the first image signal VD1 including the tracked human object in the storage medium 1230.

The content analysis module 1222 may generate a target object detection signal DS when the human object being tracked is positioned in a predetermined area in the first image signal VD1, for example, in an area adjacent to the sales stand. That is, the human object being tracked may be defined as a target object when the human object is positioned in the predetermined area in the first image signal VD1. The target object detection signal DS may be provided to the event signal generation module 1223.

The event signal generation module 1223 may be configured to generate the event signal EVT based on the detection signal from the event detection sensor 1125 and the target object detection signal DS. As described with reference to FIG. 14, generating the detection signal from the event detection sensor 1125 may indicate that at least one of the products displayed on the sales stand is moved or removed. In addition, it may be presumed that the product displayed on the sales stand is moved or removed by the human object (i.e., target object) adjacent thereto. The event signal generation module 1223 may generate the event signal EVT when the target object detection signal DS is enabled and the detection signal from the event detection sensor 1125 is enabled. The generated event signal EVT may be provided to the capture mode control module 1221.

The capture mode control module 1221 may transmit the mode selection signal MD to the first camera 1111 transmitting the first image signal VD1 in response to the event signal EVT. The first camera 1111 may provide the second image signal VD2 in response to the mode selection signal MD. The content analysis module 1222 may continuously track the human object in the second image signal VD2 and store at least a portion of the second image signal VD2 in the storage medium 1230. The content analysis module 1222 may relate information related to the moved or removed product, included in the detection signal from the event detection sensor 1125 to the second image signal VD2, and may then further store the same in the storage medium 1230.

The content analysis module 1222 may transmit an alarm signal ARM to the payment information storage module 1224 when the human object being tracked in the second image signal VD2 is positioned in an area adjacent to the POS device 1120. The area adjacent to the POS device 1120 may be predetermined in the second image signal VD2. For example, the content analysis module 1222 may generate the alarm signal ARM depending on whether the human object crosses a predetermined virtual line in the second image signal VD2 or overlaps with a predetermined virtual area.

The payment information storage module 1224 may receive the payment information TRSC through the communicator 1210. The payment information TRSC may be received from the POS device 1120 as described with reference to FIG. 14. The payment information TRSC may include various types of information such as a paid product, at least one category in which the paid product is included, the payment amount, and the purchaser information such as the gender and age of the purchaser.

The payment information storage module 1224 may determine whether the payment information TRSC is related to the second image signal VD2 based on the alarm signal ARM, and may relate at least a portion of the payment information TRSC to the second image signal VD2 based on a result of the determination, and store the same in the storage medium 1230. Whether the payment information TRSC is related to the second image signal VD2 may be determined depending on whether a difference between time when the payment information TRSC is received and time when the alarm signal ARM is received is within threshold time. The payment information storage module 1224 may relate at least a portion of the payment information TRSC to the second image signal VD2, and store the same in the storage medium 1230 when the difference between the time when the payment information TRSC is received and the time when the alarm signal ARM is received is within the threshold time.

The capture mode control module 1221 may be configured to control an overall operation of the camera controller 1220. The capture mode control module 1221 may output the first and second image signals VD1 and VD2 and the payment information TRSC, stored in the storage medium 1230, to the external database server 1150, and may store the same therein. The database server 1150 may be accessed by a user terminal (not shown), and the user terminal may receive the first and second image signals VD1 and VD2 and the payment information TRSC from the database server 1150. It may be identified whether the first and second image signals VD1 and VD2 are related to a theft of the product or a normal payment based on the payment information TRSC. For example, the first and second image signals VD1 and VD2 stored without being related to the payment information TRSC may be related to the theft of the product. The capture mode control module 1221 may provide a user alarm when none of the first and second image signals VD1 and VD2 has the payment information TRSC. The user alarm may be displayed on a display device (not shown) of the camera control device 1130. It may be identified whether the first and second image signals VD1 and VD2 are related to the theft of the product or the normal payment based on information related to the moved or removed product, included in the detection signal from the event detection sensor 1125 and the payment information TRSC. For example, the first and second image signals VD1 and VD2 may be related to the theft of the product when the information related to the moved or removed product does not match a product list of the payment information TRSC. Even in this case, the capture mode control module 1221 may provide the user alarm.

The capture mode control module 1221, content analysis module 1222 and event signal generation module 1223 may each be implemented in hardware, software, firmware and combinations thereof, may be coupled to or separated from each other according to an exemplary embodiment, and their functions may be performed by more or fewer modules.

In the exemplary embodiments, the content analysis module 1222 may further include at least one of various types of image analysis algorithms capable of detecting whether the product object is picked up by the human object, and may detect the movement or removal of the product object based thereon. For example, the content analysis module 1222 may be configured to detect whether the product object deviates from the virtual line in the first image signal VD1. For example, the content analysis module 1222 may be configured to determine a representative coordinate value of each product object and detect the product object whose representative coordinate value is changed. For example, the content analysis module 1222 may be configured to detect whether a portion (e.g., hand) of the human object being tracked in the first image signal VD1 overlaps with the product object and whether the product object is moved. The content analysis module 1222 may detect the movement or removal of the product object using various image analyses, and may generate the event signal EVT based on the detection result. In this case, the event signal generation module 1223 may be omitted.

In addition, the content analysis module 1222 may be configured to further detect information related to the corresponding product object, such as the information on the sales stand, the information on the products displayed on the sales stand, and information on the types of the products displayed on the sales stand, through an image analysis algorithm. The content analysis module 1222 may include the various image analysis algorithms for generating the information related to the product object, may relate the generated information related to the product object to the first image signal VD1 and/or the second image signal VD2, and may then store the same in the storage medium 1230. In this case, the event detection sensor 1125 of FIG. 14 may be omitted. In the exemplary embodiments, a feature point corresponding to the product object and the information related to the product object may be stored in the storage medium 1230 or the database server 1150. In this case, the content analysis module 1222 may extract the feature point from the product object detected to be moved or removed, and may provide the related information corresponding to a point matching the extracted feature point among the stored feature points. For example, the related information may be text data. In the exemplary embodiments, the content analysis module 1222 may further include an optical character reader (OCR) configured to extract the text data from the product object detected to be moved or removed, and at least some of the extracted text data may be provided as the related information. In the exemplary embodiments, a pattern capable of representing a shape of the product object and the information related to the product object may be stored in the storage medium 1230 or the database server 1150. In this case, the content analysis module 1222 may determine the pattern of the product object detected to be moved or removed, and may provide the related information corresponding to a pattern matching the determined pattern among the stored patterns.

In the exemplary embodiments, the database server 1150 may store a plurality of images each including a human object, and the content analysis module 1222 may be configured to determine whether a human object matches any one of the human objects of the database server 1150 when the human object is detected from the first image signal VD1, and to generate the event signal EVT based on a result of the determination. Here, the face detection algorithm may be used to determine the identity of the human object.

According to an exemplary embodiment of the present disclosure, it is possible to store the second image signal VD2 capturing a visitor who picks up the product displayed on the sales stand and the visitor's payment information TRSC. Accordingly, it may be confirmed whether the visitor who picks up the product pays for the product. In addition, based on a user need, it is possible to further store the first image signal VD1 capturing the visitor before the visitor picks up the product displayed on the sales stand.

According to an exemplary embodiment of the present disclosure, the first image signal VD1 of a lower frame rate may be provided before the visitor picks up the product, and the second image signal VD2 of a higher frame rate may be provided when the visitor picks up the product. Accordingly, it is possible to use a smaller storage space to store all the image signals, while securing the image signal of a higher frame rate in relation to the visitor who picks up the product.

Figure 16:
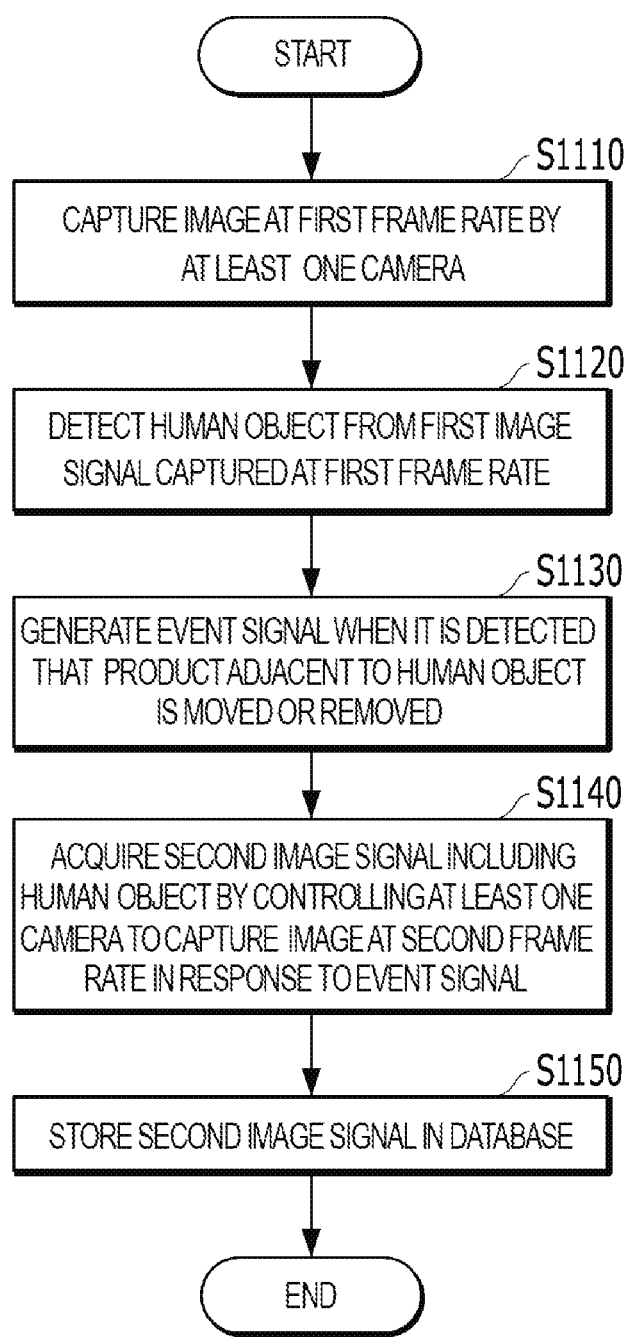
FIG. 16 is a flow chart showing an operation method of a camera control device according to an exemplary embodiment of the present disclosure.

FIG. 16 is a flow chart showing an operation method of a camera control device according to an exemplary embodiment of the present disclosure.

Referring to FIGS. 14 and 16, in operation S1110, an image may be captured at a first frame rate by at least one camera. Accordingly, the camera control device 1130 may receive a first image signal VD1 of the first frame rate.

In operation S1120, a human object may be detected and tracked from the first image signal VD1. The camera control device 1130 may detect the human object from the first image signal VD1 through appropriate algorithms such as a human detection algorithm and a face detection algorithm, and may track the detected human object.

In operation S1130, an event signal may be generated when it is detected that a product adjacent to the human object is moved or removed. In the exemplary embodiments, the camera control device 1130 may detect whether the human object being tracked is positioned in a predetermined area in the first image signal VD1, for example, in an area adjacent to the sales stand. In addition, the camera control device 1130 may receive a detection signal indicating the movement or removal of a product displayed on the sales stand from the event detection sensor 1125 disposed in relation to a sales stand. The camera control device 1130 may detect that the product adjacent to the human object is moved or removed when receiving the detection signal from the event detection sensor 1125 while the human object is positioned in the predetermined area in the first image signal VD1. The camera control device 1130 is here supposed to generate the event signal. In other exemplary embodiments, the camera control device 1130 may detect the movement or removal of the product object by including at least one of various types of image analysis algorithms capable of detecting disappearance of an object. In this case, the camera control device 1130 may generate the event signal when the movement or removal of the product object is detected. Here, the camera control device 1130 may also generate the event signal by further referencing whether the human object is positioned in the predetermined area in the first image signal VD1 (e.g., area adjacent to the sales stand).

In operation S1140, a second image signal including the human object being tracked may be acquired by controlling at least one camera to capture the image at a second frame rate in response to the event signal. The camera control device 1130 may transmit a mode selection signal MD to a camera currently capturing the human object being tracked, thereby allowing the camera to capture the image at the second frame rate.

In operation S1150, a database may store at least a portion of the second image signal VD2 including the corresponding human object.

Figure 17:
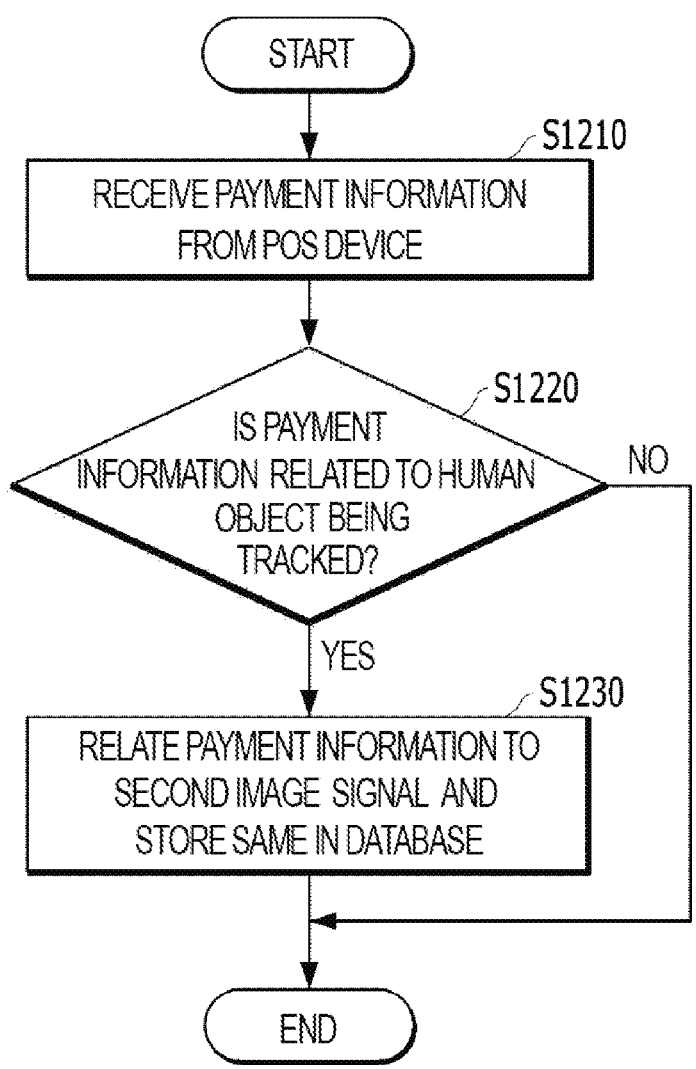
FIG. 17 is a flow chart showing a method of storing an image together with payment information according to an exemplary embodiment.

FIG. 17 is a flow chart showing a method of storing an image together with payment information according to an exemplary embodiment.

Referring to FIGS. 14 and 17, in operation S1210, the camera control device 1130 may receive payment information from the POS device 1120.

In operation S1220, the camera control device 1130 may determine whether the payment information TRSC is related to the human object being tracked. If this is the case, operation S1230 may be performed. If this is not the case, operation S1240 may be performed. The camera control device 1130 may detect whether the human object being tracked from the second image signal VD2 is positioned in the area adjacent to the POS device 1120. For example, the camera control device 1130 may detect whether the human object overlaps with a predetermined virtual area (i.e., area adjacent to 1120) in the second image signal VD2. addition, the camera control device 1130 may determine that the payment information TRSC is related to the human object in a case where time when the camera control device 1130 receives the payment information TRSC is within threshold time from the time when the human object is positioned in the area adjacent to the POS device 1120.

In operation S1230, the payment information TRSC may be related to the second image signal VD2 and then stored in the database.

According to an exemplary embodiment of the present disclosure, it is possible to store the second image signal capturing a visitor who picks up the product displayed on the sales stand and the visitor's payment information. Accordingly, it may be confirmed whether the visitor who picks up the product pays for the product. In addition, based on a user need, it is possible to further store the first image signal capturing the visitor before the visitor picks up the product displayed on the sales stand.

According to an exemplary embodiment of the present disclosure, the first image signal of a lower frame rate may be provided before the visitor picks up the product, and the second image signal of a higher frame rate may be provided when the visitor picks up the product. Accordingly, it is possible to use a smaller storage space to store all the image signals, while securing the image signal of a higher frame rate in relation to the visitor who picks up the product.

Figure 18:
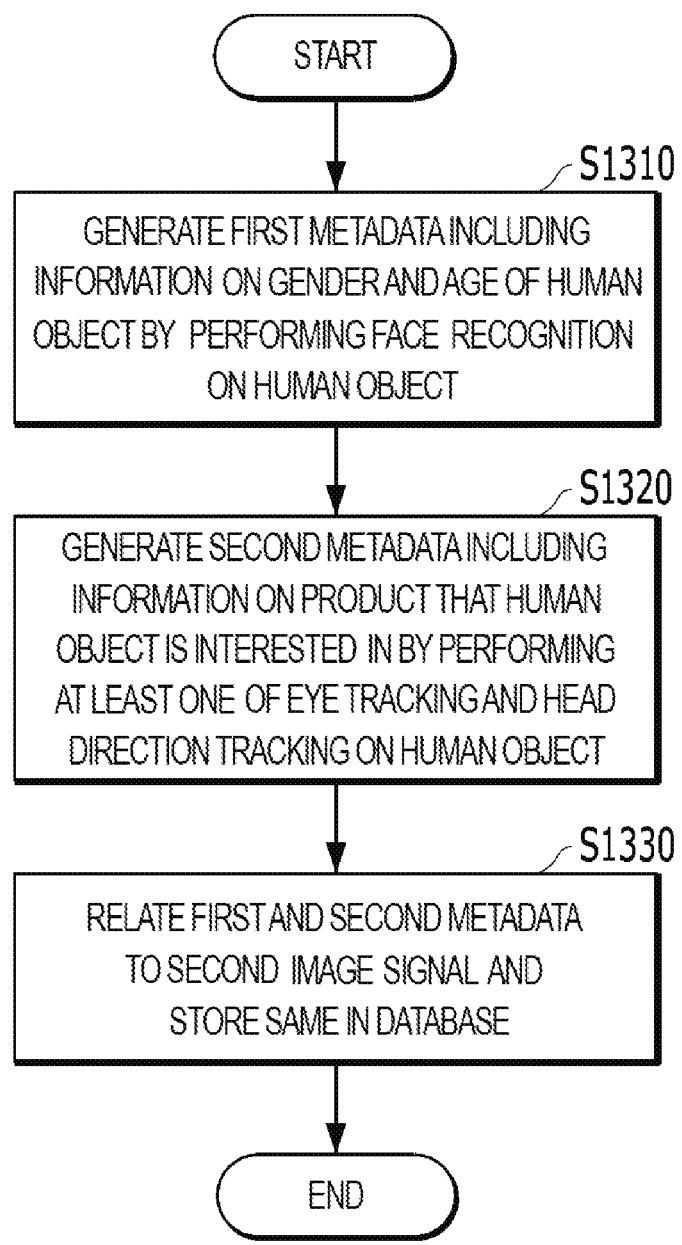
FIG. 18 is a flowchart showing a method of generating and storing metadata related to a human object according to an exemplary embodiment of the present disclosure.

FIG. 18 is a flowchart showing a method of generating and storing metadata related to a human object according to an exemplary embodiment of the present disclosure.

In operation S1310, the camera control device 1130 may generate first metadata including information on the gender and age of the human object by performing face recognition on the human object. The first metadata may further include information on time in which the moving human object stays in each portion of the image signal.

In operation S1320, the camera control device 1130 may estimate the product and/or the type of a product that the human object is interested in by performing at least one of an eye tracking and a head direction tracking on the human object, and may generate second metadata including information on the estimated product. The first metadata may be a reference for generating the second metadata.

In operation S1330, the camera control device 1130 may relate the first and second metadata to the second image signal VD2 and the payment information TRSC, and then store the same in the database. Accordingly, the first and second metadata may be provided together with the second image signal VD2 and the payment information TRSC, which may be used to identify people's purchasing tendencies.

In the exemplary embodiments, the content analysis module 1222 of the camera control device 1130 described with reference to FIG. 15 may be configured to perform the operations of FIG. 18.

Figure 19:
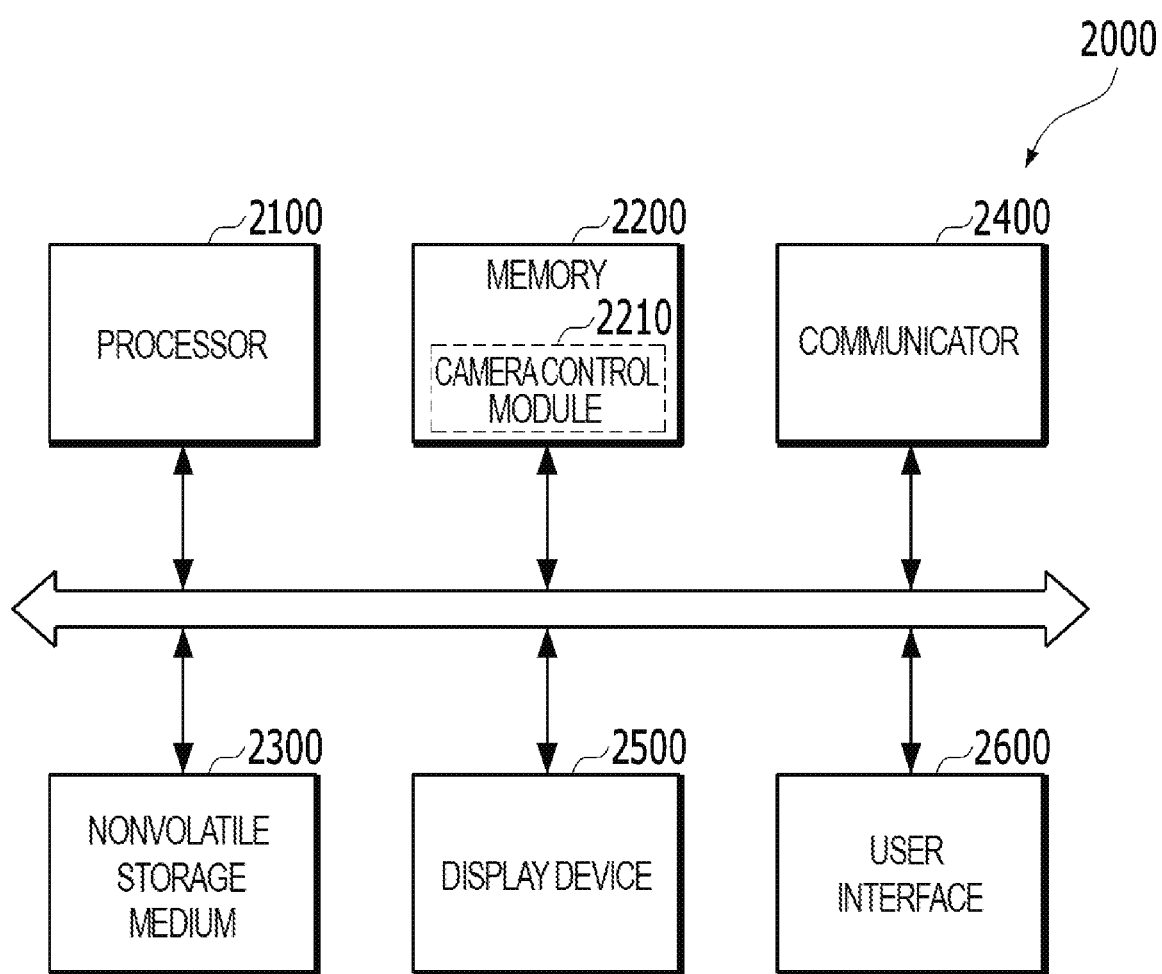
FIG. 19 is a block diagram showing an exemplary computer device for implementing a camera control device of FIG. 14.

FIG. 19 is a block diagram showing an exemplary computer device for implementing the camera control device of FIG. 14.

Referring to FIG. 19, a computer device 2000 may include a processor 2100, a memory 2200, a nonvolatile storage medium 2300, a communicator 2400, a display device 2500 and a user interface 2600.

The processor 2100 may load an instruction and/or a program code causing the operation and/or the procedure, described with reference to FIGS. 15 to 18, and may allow the loaded instruction and/or the program code to be performed. For example, the processor 2100 may allow a camera control module 2210, which performs the functions of the camera controller 1220 of FIG. 15, when allowed by the processor 2100, to be loaded from the nonvolatile storage medium 2300 into the memory 2200, and may allow the loaded camera control module 2210 to be performed.

The memory 2200 may include at least one of various types of memories such as static RAM (SRAM), dynamic RAM (DRAM) and synchronous DRAM (SDRAM). In an exemplary embodiment, the memory 2200 may be used as a working memory of the processor 2100. In another exemplary embodiment, the processor 2100 may include a working memory separate from the memory 2200. The memory 2200 may be provided as the storage medium 1230 of FIG. 15. In this case, the memory 2200 may store the first image signal VD1 (see FIG. 15), the second image signal VD2 (see FIG. 15), the information related to the moved or removed product, and the payment information TRSC (see FIG. 15).

The nonvolatile storage medium 2300 may include various types of storage media retaining stored data even when power is cut off, for example, storage media such as a flash memory and a hard disk.

The communicator 2400 (or transceiver) may transmit and receive a signal between the computer device 2000 and another external device. The communicator 2400 may be provided as the communicator 1210 of FIG. 15.

The display device 2500 may display information processed by the computer device 2000 under a control of the processor 2100.

The user interface 2600 may detect a user input for controlling an operation of the computer device 2000 and generate corresponding input data. The user interface 2600 may include an input device such as a keypad, a mouse, a fingerprint sensor, a dome switch, a touch pad, or a jog wheel, which may detect a command or information by a user operation.

Figure 20:
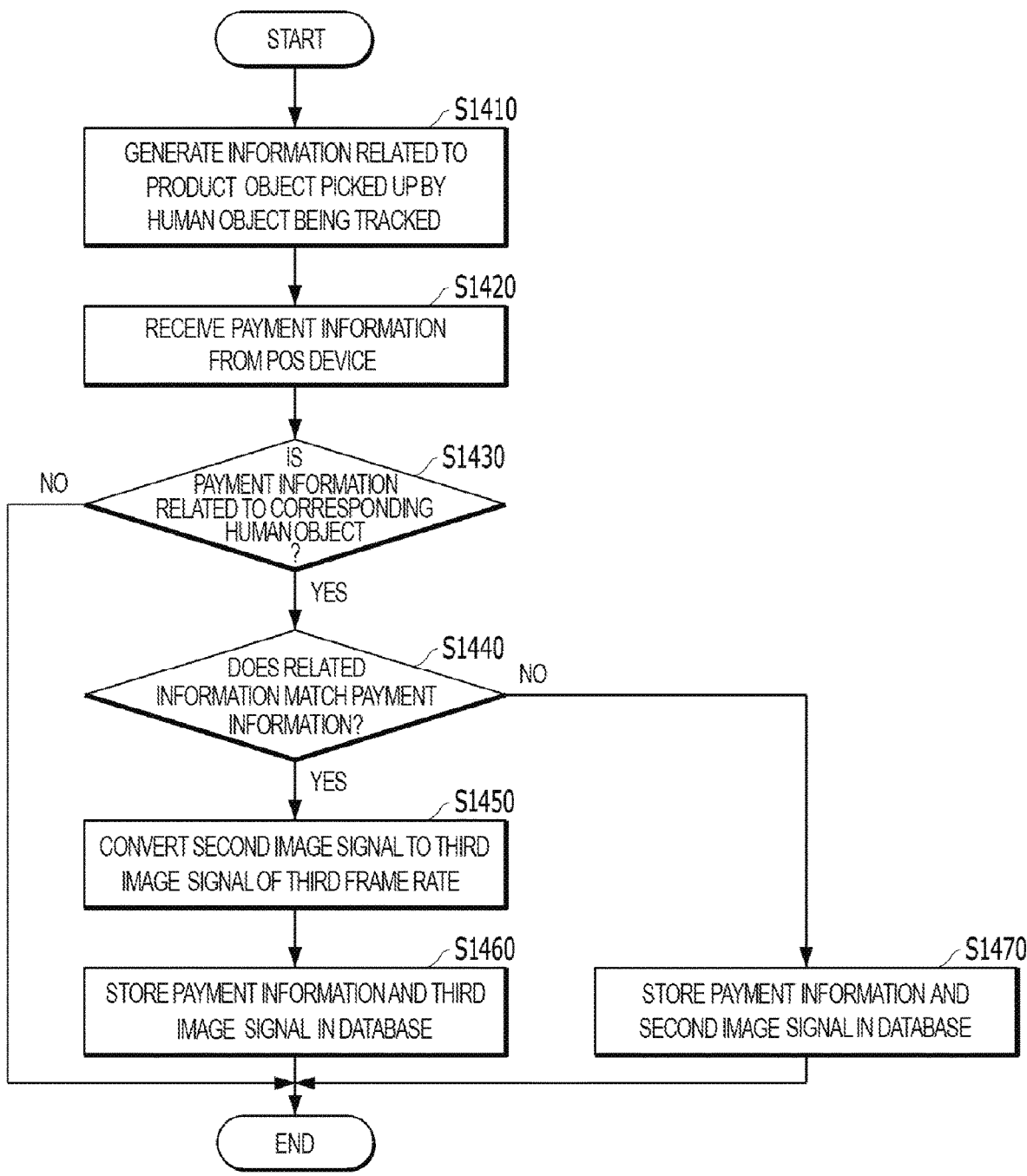
FIG. 20 is a flow chart showing a method of storing an image together with payment information according to another exemplary embodiment.

FIG. 20 is a flow chart showing a method of storing an image together with payment information according to another exemplary embodiment.

Referring to FIGS. 14 and 20, in operation S1410, information related to the product object picked up by the human object being tracked may be generated. As described in operations S1120 and S1130 of FIG. 16, it is possible to detect and track the human object from the first image signal VD1, and detect that the product object is picked up (or moved or removed) by the human object being tracked. Furthermore, in this operation, the information related to the picked-up product object may be generated. In the exemplary embodiments, the camera control device 1130 may receive the detection signal including the information related to the picked-up product object from the event detection sensor 1125, as described above. In other exemplary embodiments, the camera control device 1130 may identify the picked-up product object and generate the related information through the various image analysis algorithms.

In operation S1420, the camera control device 1130 may receive the payment information TRSC from the POS device 1120.

In operation S1430, the camera control device 1130 may determine whether the payment information TRSC is related to the human object being tracked. If this is the case, operation S1440 may be performed.

In operation S1440, the camera control device 1130 may determine whether the related information matches the payment information TRSC. If this is the case, operation S1450 may be performed. If this is not the case, operation S1470 may be performed.

In operation S1450, the camera control device 1130, for example, a payment information storage module 1224 (see FIG. 15) may convert the second image signal VD2 to a third image signal of a third frame rate. The third frame rate may be lower than the second frame rate corresponding to the second image signal VD2. As described above, the camera control device 1130 may convert the second image signal VD2 to the third image signal having the lower frame rate. The third frame rate may be substantially the same as the first frame rate corresponding to the first image signal VD1.

In operation S1460, the payment information TRSC and the third image signal may be stored in the database. In this case, the second image signal VD2 remaining in the memory or storage medium 1230 may be deleted. In operation S1470, the payment information TRSC and the second image signal VD2 may be stored in the database. In operations S1460 and S1470, the first image signal VD1 and the related information may be further stored in the database.

If the product list based on the related information matches the product list of the payment information TRSC, the corresponding image information may be an image capture of a normal purchasing behavior. In this case, the camera control device 1130 may convert the second image signal VD2 of the second frame rate to the third image signal VD3 of the lower third frame rate and store the third image signal in the database. The storage space of the database may thus be saved. If the product list based on the related information does not match the product list of the payment information TRSC, the corresponding image signal may be related to a theft of the product. In this case, the camera control device 1130 may store the second image signal VD2 of a higher second frame rate in the database. It is possible to use a smaller storage space to store the image signals while securing the higher frame rate image signal in relation to the visitor related to the theft of the product.

Figure 21:
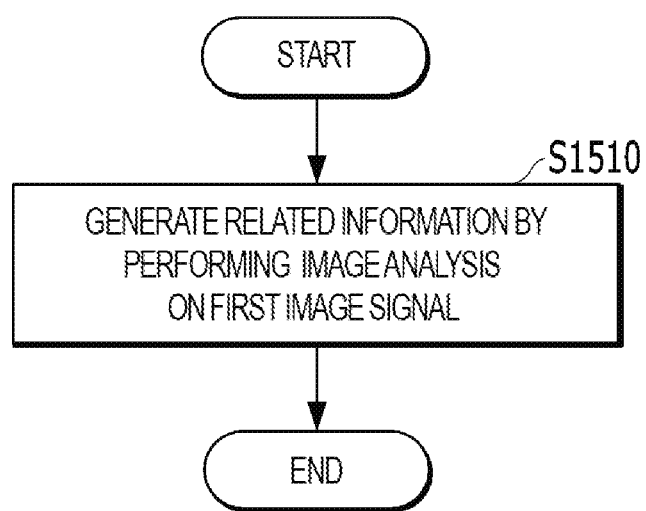
FIG. 21 is a flow chart showing a method of generating information related to a product object according to an exemplary embodiment.

FIG. 21 is a flow chart showing a method of generating information related to a product object according to an exemplary embodiment.

In operation S1510, the camera control device 1130 may generate information related to the picked-up product object by performing image analysis on the first image signal VD1. The camera control device 1130 may include various image analysis algorithms for generating the information related to the product object. For example, a feature point corresponding to the product object and the information related to the product object may be stored in the storage medium 1230 (see FIG. 15) or the database server 1150, and the camera control device 1130 may extract the feature point from the picked-up product object, and may provide the related information corresponding to a point matching the extracted feature point among the stored feature points. As another example, a pattern capable of representing a shape of the product object and the information related to the product object may be stored in the storage medium 1230 or the database server 1150, and the camera control device 1130 may determine the pattern of the picked-up product object, and may provide the related information corresponding to a pattern matching the determined pattern among the stored patterns. In the exemplary embodiments, the related information may be text data.

Figure 22:
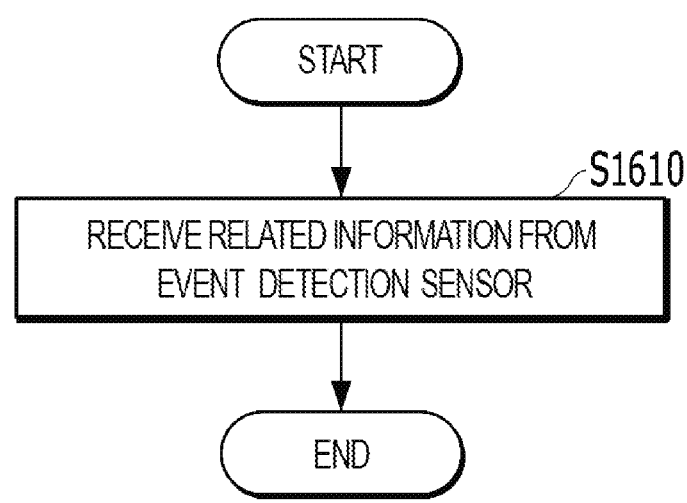
FIG. 22 is a flow chart showing a method of generating information related to a product object according to another exemplary embodiment.

FIG. 22 is a flow chart showing a method of generating information related to a product object according to another exemplary embodiment.

In operation S1610, the camera control device 1130 may receive the related information from the event detection sensor 1125. Like a pressure sensor or a weight sensor, the event detection sensor 1125 may be configured to detect that a product displayed on the sales stand is picked up, and to generate the detection signal based thereon. The detection signal may include the information related to the picked-up product, such as information on the sales stand, information on products displayed on the sales stand, information on types of the products displayed on the sales stand, the identification number of the event detection sensor 1125, etc.

Hereinafter, an automatic payment system according to another embodiment disclosed in the present disclosure will be described.

Referring again to FIGS. 2 to 4 and 14, an automatic payment system 100 according to an embodiment disclosed in the present disclosure may include first and second conveyer stages arranged 111 and 112 along a conveying route on which products are moved, a slope SL disposed between the first and second conveyer stages 111 and 112 on the conveying route, at least one ID sensor 151~154 facing the first and second conveyer stages 111 and 112 to sense IDs attached to the products when the products overlap the first and second conveyer stages 111 and 112, a bottom ID sensor 180 facing the conveyer route under the slope SL, at least one camera 140 and 160 configured to provide an image by taking a picture of at least a portion of the conveying route and a sales stand on which the products are displayed, and a controller 130 configured to control the at least one ID sensor 151~154, the bottom ID sensor 180, and the at least one camera 140 and 160.

The at least one camera 140 and 160 captures not only the first conveyer stage 111 and the second conveyer stage 112, but also the sales stands on which the products are displayed, so that the displayed products in the sales stands and people in the vicinity of the sales stand are captured and the captured images can be provided. The at least one camera 140 and 160 may be installed throughout the store, like the cameras 1111 to 111m of FIG. 14 as well as the support 120 of FIG. 1.

The controller 130 may be configured to generate payment information for the products based on at least one of the detection signals received from the at least one ID sensor 151~154, the bottom ID sensor 180, and the at least one camera 140 and 160.

The controller 130 may be configured to receive a first image captured at a first frame rate by the at least one camera 140 and 160, detect a human object from the first image, generate an event signal when it is detected that the products are picked up by the human object from the first image.

The controller 130 may also be configured to acquire a second image including the human object by controlling the at least one camera 140 and 160 to capture the image at a second frame rate higher than the first frame rate in response to the event signal, and store the payment information and the second image in a database 1150.

The component of the automatic payment system 100 may include all of the components of FIGS. 2 to 4.

In addition, the image capture system 1100 of FIGS. 14 to 18 and the computer device 2000 of FIGS. 19 to 22 may be included in the component of the automatic payment system 100, and the automatic payment system 100 may provide the controller 130 with images of various places, sales stands where products are displayed, a person near the sales stands, and images of the person's movement.

The cameras 1111 to 111m of FIG. 14 may be used as a part of the cameras 140 and 160, and provide images of displayed products and people around the sales stands by capturing pictures of products moving on the first and second conveyer stages 111 and 112 and/or sales stands with the displayed products.

The POS device 1120 of FIG. 14 may be included in the components of the automatic payment system 100 to provide payment information for a product selected by a person (i.e., a customer).

Therefore, the automatic payment system 100 according to the embodiment disclosed in the present disclosure may compare and analyze event signals for products picked up by the person object and the payment information for products by the ID detectors 151~154 and 180, notify the user of a suspected theft situation of the product when an unpaid product exist among the products picked up by the person object, and leave a high-resolution second image of the situation in which the person object picks up a product in the database server 1150.

The controller 130 may be also configured to generate information related to the products picked up by the person object, and convert the second image to a third image of a third frame rate and store the payment information and the third image in the database server 1150 when the related information matches the payment information, and store the payment information and the second image in the database server 1150 when the related information does not match the payment information. Here, the quality (e.g., the frame rate) of the third image may be lower than the quality of the second image and may be substantially the same as the quality of the first image.

In addition, the controller 130 may be configured to generate the related information by performing image analysis on the first image, and store at least one of the first image and the related information in the database server 1150.

In addition, the automatic payment system 100 may further include a sensor disposed adjacent to the first conveyer stage and configured to generate trigger signals by detecting that the products enter the conveying route. The controller 130 may be configured to map the ID of the product detected by the at least one ID detector 151~154 and 180 to the trigger signals.

The above-described components are not essential, so an automatic payment system having more or fewer components may be implemented. In addition, each of these components may be implemented through hardware, software, firmware, and a combination thereof, and may be combined or separated according to an embodiment, and the functions of these components may be performed by more or fewer modules.

Although specific embodiments and applications were described herein, these are provided only to help more generally understand the present disclosure, the present disclosure is not limited to the embodiments described above, and the present disclosure may be changed and modified in various ways from the description by those skilled in the art.

Therefore, the sprit of the present disclosure should not be limited to the above-described embodiments, and the following claims as well as all modified equally or equivalently to the claims are intended to fall within the scope and spirit of the disclosure.

What is claimed is:

1. An automatic payment system comprising:
first conveyer stage and second conveyer stage arranged along a conveying route on which products are moved;
at least one camera configured to face the first conveyer stage to obtain images of products when the products overlaps the first conveyer stage; and
a controller configured to recognize products on the first conveyer stage based on an image obtained by the at least one camera, and generate payment information for the recognized products,
wherein the controller controls the conveying speeds of the first conveyer stage and the second conveyer stage at different speeds to adjust conveying time intervals of products,
wherein the controller controls the conveying speeds based on the at least one of the number of products, the kinds of products, the shapes of products, the sizes of products, and the supply time intervals of products,
wherein the controller controls the conveying speeds to recognize products on the first conveyer stage based on the images obtained by the at least one of camera,
further comprising an event detection sensor configured to measure the weight of products on the first conveyer stage and the second conveyer stage,
wherein the controller generates an event detection signal for products on the first conveyer stage and the second conveyer stage based on the weight measurement result by the event detection sensor, generates an image signal for a product for which the event detection signal was generated by controlling the at least one of camera, and provides a user alarm when payment information for a product corresponding to the image signal does not exist, and
wherein the controller receives a first image captured at a first frame rate by the at least one camera, recognizes products in the first image, generates an event signal for a product for which the event detection signal is generated, of products recognized in the first image, obtains a second image by controlling the at least one camera to capture a image at a second frame rate higher than the first frame rate in response to the event signal, provides a user alarm when payment information for products in the second image does not exist, and stores the payment information and the second image in a database.

2. An automatic payment system comprising:
conveyer stages arranged along a conveying route on which products are moved;
at least one camera configured to obtain images of products by capturing at least a portion of a conveying route;
an event detection sensor configured to measure the weight of a product on the conveyer stages; and
a controller configured to recognize products on the first conveyer stage based on the images obtained by the at least one camera, and generate payment information for the recognized product,
wherein the controller generates an event detection signal for a product on the conveying stages based on the weight measurement result by the event detection sensor, generates an image signal for the product for which the event detection signal was generated by controlling the at least one of camera, and provides a user alarm when payment information for the product corresponding to the image signal does not exist, and wherein the controller receives a first image captured at a first frame rate by the at least one camera, recognizes products in the first image, generates an event signal for a product for which the event detection signal is generated, of products recognized in the first image, obtains a second image by controlling the at least one camera to capture a image at a second frame rate higher than the first frame rate in response to the event signal, provides a user alarm when payment information for a product in the second image does not exist, and stores the payment information and the second image in a database.

3. The automatic payment system of claim 2, wherein the conveyer stages comprise first conveyer stage and second conveyer stage having different conveying speeds.

4. The automatic payment system of claim 2, wherein the controller controls the conveying speeds based on the at least one of the number of products, the kinds of products, the shapes of products, the sizes of products, and the supply time intervals of products.

5. The automatic payment system of claim 4, wherein the controller controls the conveying speeds to recognize the products on the first conveyer stage based on the images obtained by the at least one of camera.

6. A computer device communicating with at least one camera and at least one weight measurement sensor through a network, the computer device comprising:
 a communicator; and
 a processor configured to communicate with the at least one camera and the at least one weight measurement sensor through the communicator,
 wherein the processor is configured to allow:
 a first image captured to be received by the at least one camera,
 a product object to be recognized from the first image,
 payment information for the recognized product object to be generated,
 an event signal to be generated when detecting that the product object is picked up based on the weight measurement result of the at least one weight measurement sensor,
 a second image comprising the product object to be obtained in response to the event signal by controlling the at least one camera to capture an image, and
 a user alarm to be provided when payment information for the product object in the second image does not exist.

7. The computer device of claim 6, wherein the processor is configured to allow the payment information and the second image to be stored in a database.

8. The computer device of claim 7, wherein the processor is configured to allow:
 information related to the detected product object to be generated;
 the second image to be converted to a third image of a third frame rate depending on whether the related information matches the payment information, the third frame rate being lower than the second frame rate; and
 the payment information and the third image to be stored in the database.

9. The computer device of claim 8, wherein the processor is configured to allow:
 the payment information and the third image to be stored in the database when the related information matches the payment information; and
 the payment information and the second image to be stored in the database when the related information does not match the payment information.

10. The computer device of claim 9, wherein the processor is configured to allow the first image and at least one of the related information to be further stored in the database.

11. The computer device of claim 8, wherein the processor is configured to allow the related information to be generated by performing image analysis on the first image.

12. The computer device of claim 6, wherein the processor is configured to allow:
 first metadata including information on the gender and age of the human object to be generated by recognizing a human object in the first image and performing face recognition on the human object;
 second metadata including information on a product that the human object is interested in to be generated by performing at least one of an eye tracking and a head direction tracking on the human object; and
 the first and second metadata to be stored in the database by relating the first and second metadata to the second image.

* * * * *